US012756803B2

(12) United States Patent
Hwang et al.

(10) Patent No.: US 12,756,803 B2
(45) Date of Patent: Oct. 6, 2026

(54) ELECTRONIC DEVICE FOR DISPLAYING MEDIA CONTENT AND USER INTERFACE IN PLURALITY OF AREAS AND METHOD THEREOF

(71) Applicant: SAMSUNG ELECTRONICS CO., LTD., Suwon-si (KR)

(72) Inventors: Sungjun Hwang, Suwon-si (KR); Jiyeon Ma, Suwon-si (KR); Kihyoung Son, Suwon-si (KR); Jingun Jung, Suwon-si (KR); Youngah Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 250 days.

(21) Appl. No.: 18/240,226

(22) Filed: Aug. 30, 2023

(65) Prior Publication Data

US 2024/0179280 A1 May 30, 2024

Related U.S. Application Data

(63) Continuation of application No. PCT/KR2023/012303, filed on Aug. 18, 2023.

(30) Foreign Application Priority Data

Nov. 29, 2022 (KR) ........................ 10-2022-0163471

(51) Int. Cl.
*H04N 9/31* (2006.01)
*G06F 3/0481* (2022.01)
(Continued)

(52) U.S. Cl.
CPC ......... *H04N 9/3179* (2013.01); *G06F 3/0481* (2013.01); *G06F 3/0484* (2013.01); *G06F 3/1407* (2013.01); *G06F 2203/04803* (2013.01)

(58) Field of Classification Search
CPC .. H04N 9/3179; H04N 9/3194; G06F 3/0481; G06F 3/0484; G06F 3/1407; G06F 2203/04803
See application file for complete search history.

(56) References Cited

U.S. PATENT DOCUMENTS 8,284,216 B2 10/2012 Matsuda
9,183,605 B2 11/2015 Matsuoka et al.
(Continued)

FOREIGN PATENT DOCUMENTS

JP 4009851 B2 11/2007
JP 2016-173452 A 9/2016
(Continued)

OTHER PUBLICATIONS

International Search Report (PCT/ISA/210) issued on Dec. 14, 2023 by the International Searching Authority in International Patent Application No. PCT/KR2023/012303.
(Continued)

*Primary Examiner* — Michael E Teitelbaum
(74) *Attorney, Agent, or Firm* — Sughrue Mion, PLLC

(57) ABSTRACT

An electronic device is provided for obtaining information for a plane on which light emitted from a projector is to be projected. The electronic device includes a processor, which identifies, from the plane based on the information, a first area having a first ratio, and a second area smaller than the first area. Moreover, the processor obtains, in a state that a media content displays in the first area identified by a communication circuitry, user interface (UI) associated with the media content. The processor controls the projector to display, in the second area, the UI having layout based on a width and a height of the second area. The electronic device
(Continued)

may be provided in a metaverse or in a metaverse service for enhancing interconnectivity between real and virtual objects.

20 Claims, 13 Drawing Sheets

(51) Int. Cl.
*G06F 3/0484* (2022.01)
*G06F 3/14* (2006.01)

(56) References Cited

U.S. PATENT DOCUMENTS 9,484,005 B2 11/2016 Rezaiifar et al.
9,723,293 B1 * 8/2017 Cederlof ................. G06T 7/521
10,209,513 B2 2/2019 Woo et al.
10,276,133 B2 4/2019 Uema
10,432,901 B2 10/2019 Masuko
10,506,290 B2 12/2019 Lee et al.
10,592,714 B2 3/2020 Jung et al.
11,636,881 B2 * 4/2023 Aliverti .................... H04N 9/79 386/243
11,755,180 B1 * 9/2023 Edelblut ............... G06F 3/0484 715/760
2015/0179147 A1 * 6/2015 Rezaiifar ................ G06F 3/011 345/625
2016/0154824 A1 * 6/2016 Song ................ H04N 21/44008 345/634
2017/0249726 A1 * 8/2017 Rochford ................ G06F 1/163
2021/0158730 A1 * 5/2021 Kondo .................. G06F 18/241
2022/0038668 A1 * 2/2022 Tsui ........................ G06T 7/194

FOREIGN PATENT DOCUMENTS

JP 6102215 B2 3/2017
JP 6479220 B2 3/2019
JP 2020-198478 A 12/2020
KR 10-2011-0072744 A 6/2011
KR 10-2015-0033320 A 4/2015
KR 10-1842075 B1 3/2018
KR 10-1931788 B1 12/2018
KR 10-2029756 B1 10/2019
KR 10-2163742 B1 10/2020

OTHER PUBLICATIONS

Written Opinion (PCT/ISA/237) issued on Dec. 14, 2023 by the International Searching Authority in International Patent Application No. PCT/KR2023/012303.
Communication dated Apr. 16, 2026, issued by the Korean Ministry of Intellectual Property in Korean Application No. 10-2022-0163471.

* cited by examiner

ELECTRONIC DEVICE FOR DISPLAYING MEDIA CONTENT AND USER INTERFACE IN PLURALITY OF AREAS AND METHOD THEREOF

CROSS-REFERENCE TO RELATED APPLICATION(S)

This application is a continuation of PCT International Application No. PCT/KR2023/012303, which was filed on Aug. 18, 2023, and claims priority to Korean Patent Application No. 10-2022-0163471, filed on Nov. 29, 2022, in the Korean Intellectual Property Office, the disclosures of which are incorporated by reference herein their entireties.

BACKGROUND

1. Field

The disclosure relates to an electronic device for displaying a media content and a user interface (UI) in a plurality of areas and method thereof.

2. Description of Related Art

Recently, an electronic device for visualizing information in various types of environments such as an augmented reality (AR) environment, a virtual reality (VR) environment, a mixed reality (MR) environment, and/or extended reality (XR) environment is being developed. The electronic device may include a television, a monitor, an electronic display board, a beam projector, a mobile phone, and/or a tablet personal computer (PC). The electronic device may form a display area representing the information on a surface of the electronic device or on a surface outside the electronic device.

SUMMARY

According to an aspect of the disclosure, there is provided an electronic device. The electronic device may comprise a projector, and a processor. The processor may be configured to obtain information related to a projection area on which light emitted from the projector is to be projected. The processor may be configured to identify, based on the information, a first area and a second area in the projection area, the first area may have a first ratio, and the second area may be smaller than the first area. The processor may be configured to obtain user interface (UI) associated with a media content displayed in the first area by the projector. The processor may be configured to control the projector to display, in the second area, the UI having layout configured based on a feature of the second area.

According to another aspect of the disclosure, there is provided a method of an electronic device. The method may include obtaining information related to one or more projection areas of the electronic device. The method may include displaying a media content in a first area identified in the one or more projection areas based on the information. The method may include identifying, based on the media content, a second area different from the first area, in the one or more projection areas. The method may include displaying, in the second area, user interface (UI) associated with the media content and having layout based on a feature the second area.

According to another aspect of the disclosure, there is provided a method of an electronic device. The method may include obtaining information related to a projection area on which light emitted from a projector of the electronic device is to be projected. The method may include identifying, based on the information, a first area and a second area in the projection area. The first area may have a first ratio, and the second area may be smaller than the first area. The method may include obtaining user interface (UI) associated with a media content displayed in the first area by the projector. The method may include displaying, in the second area, the UI having layout configured based on a feature of the second area.

According to an embodiment, an electronic device may include a communication circuitry, a projection assembly, and a processor. The processor may be configured to obtain information for a plane where light emitted from the projection assembly d to be projected. The processor may be configured to identify, from the plane based on the information, a first area having a preset ratio, and a second area smaller than the first area. The processor may be configured to obtain, in a state that a media content displays in the first area identified by the communication circuitry, user interface (UI) associated with the media content. The processor may be configured to display, in the second area, the UI having layout based on a width and a height of the second area.

According to an embodiment, a method of an electronic device may comprise obtaining information for a plane where light emitted from a projection assembly of the electronic device is to be projected. The method may comprise identifying, from the plane based on the information, a first area having a preset ratio, and a second area smaller than the first area. The method may comprise obtaining, in a state that a media content displays in the first area identified by a communication circuitry of the electronic device, user interface (UI) associated with the media content. The method may comprise displaying, in the second area, the UI having layout based on a width and a height of the second area.

According to an embodiment, an electronic device may include a projection assembly and a processor. The processor may be configured to obtain information with respect to one or more planes where light emitted from the projection assembly is to be projected. The processor may be configured to display, in a first area identified in the one or more planes based on the information, a media content. The processor may be configured to, based on the media content, identify, in the one or more planes, a second area distinguished from the first area. The processor may be configured to display, in the second area, user interface (UI) that is associated with the media content and having layout based on a width and height of the second area.

According to an embodiment, a method of an electronic device may comprise obtaining information with respect to one or more planes where light emitted from a projection assembly of the electronic device is to be projected. The method may comprise displaying, in a first area identified in the one or more planes based on the information, a media content. The method may comprise, based on the media content, identifying, in the one or more planes, a second area distinguished from the first area. The method may comprise displaying, in the second area, user interface (UI) that is associated with the media content and having layout based on a width and height of the second area.

DETAILED DESCRIPTION

Figure 1:
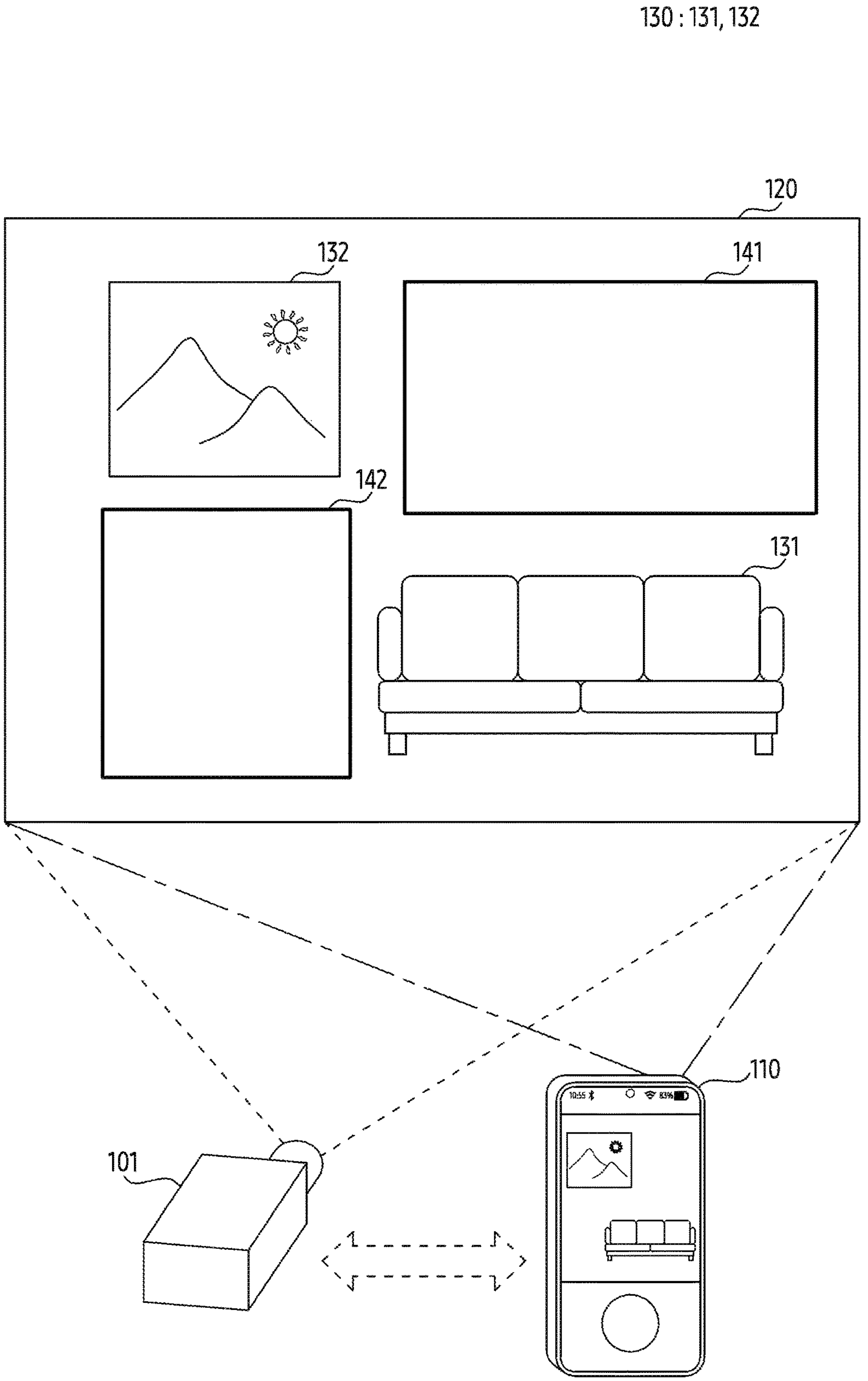
FIG. 1 illustrates an example of an operation in which an electronic device projects a media content according to an embodiment.

Hereinafter, various embodiments of the disclosure will be described with reference to the accompanying drawings.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as “A or B,” “at least one of A and B,” “at least one of A or B,” “A, B, or C,” “at least one of A, B, and C,” and “at least one of A, B, or C,” may include any one of, or all possible combinations of the items enumerated together in a corresponding one of the phrases. As used herein, such terms as “1st” and “2nd,” or “first” and “second” may be used to simply distinguish a corresponding component from another, and does not limit the components in other aspect (e.g., importance or order). It is to be understood that if an element (e.g., a first element) is referred to, with or without the term “operatively” or “communicatively”, as “coupled with,” “coupled to,” “connected with,” or “connected to” another element (e.g., a second element), it means that the element may be coupled with the other element directly (e.g., wiredly), wirelessly, or via a third element.

As used in connection with various embodiments of the disclosure, the term “module” or “unit” may include an element implemented by hardware, software, or firmware, and may interchangeably be used with other terms, for example, “logic,” “logic block,” “part,” or “circuitry”. A module or a unit may be a single integral component, or a minimum unit or part thereof, adapted to perform one or more functions. For example, according to an embodiment, the module may be implemented in a form of an application-specific integrated circuit (ASIC).

FIG. 1 illustrates an example of an operation in which an electronic device 101 projects a media content according to an embodiment. Referring to FIG. 1, the electronic device 101 according to an embodiment may include a beam projector to emit light to an external space. The electronic device 101 may output the light representing a screen formed by two-dimensionally arranged pixels. The light output from the electronic device 101 may be reflected by an object such as a plane 120. The user may view the screen based on the light reflected by the object. However, the disclosure is not limited thereto, and as such, according to an embodiment, the electronic device 101 may output the light representing an image formed by a three-dimensional (3D) representation. For example, the image may be a hologram.

Referring to FIG. 1, according to an embodiment, the electronic device 101 may identify an area on which the screen represented by the light is projectable. For example, the area may include at least one plane 120. For example the at least one plane 120 may be in an external space or an area where the light emitted by the electronic device 101 is reachable. The plane 120 may mean, for example, an object capable of reflecting the information represented by the light with visible brightness in the external space. For example, the plane 120 may include a wall surface, a projector screen and/or a beam screen. The information may be a screen or a layout including text, image, and/or video. However, the disclosure is not limited thereto, and as such, the area on which the screen represented by the light is projectable may be a planar surface or a non-planar surface. For example, the electronic device 101 may output the light representing an image formed by a three-dimensional (3D) representation on a non-planar surface. According to an embodiment, in order to identify the at least one plane, the electronic device 101 may scan the external space. For example, an operation of scanning the external space by the electronic device 101 may include an operation of recognizing at least one object included in the external space. The recognizing at least one object by the electronic device 101 may include an operation of identifying the form and/or position of the at least one object in the external space. According to an embodiment, in order to scan the external space, the electronic device 101 may obtain at least one image and/or video of the external space. Based on the obtained image and/or video, the electronic device 101 may identify at least one external object adjacent to the electronic device 101. However, the disclosure is not limited an image and/or a video captured by a camera. As such, according to an embodiment, the electronic device 101 may scan the external space using other scanners or mapping devices to obtain information about the contours of the external space. For example, the electronic device 101 may scan the external space using various types of sensors or detectors.

According to an embodiment, the electronic device 101 may scan the external space by itself. For instance, the electronic device 101 may scan the external space using one or more of the components of the electronic device 101. However, the disclosure is not limited thereto, and as such, according to an embodiment, the electronic device 101 may scan the external space by using an external electronic device 110 different from the electronic device 101. According to an embodiment, the electronic device 101 may request and/or receive information from the external electronic device 110 related to the operation of scanning the external space. Referring to FIG. 1, according to an embodiment, the electronic device 101 may exchange a signal for scanning the external space with the external electronic device 110. Although the external electronic device 110 having the appearance of a mobile phone is exemplarily illustrated, the embodiment is not limited thereto. For example, the external electronic device 110 may include any electronic device (e.g., a digital camera and/or a tablet personal computer (PC)) including a camera (or another type of sensor and/or detector) for recognizing the image and/or video with respect to the external space. One or more pieces of hardware included in the electronic device 101 and the external electronic device 110 connected to the electronic device 101 according to an embodiment will be described with reference to FIG. 2. According to an embodiment, the electronic device 101 may request information on the external space where the light output from the electronic device 101 is propagated to the external electronic device 110. For example, the electronic device 101 may request an image and/or a video capturing the external space where the light output from the electronic device 101 is propagated to the external electronic device 110.

According to an embodiment, the electronic device 101 may identify a plane 120 on which light emitted from the electronic device 101 is projected, based on the scan of the external space. The electronic device 101 may identify one or more areas (e.g., one or more occluded areas) in the plane 120, which is at least partially occluded by one or more external objects 130. In the example case of FIG. 1, the electronic device 101 may identify a first external object 131 and a second external object 132 occluding the plane 120, from the image with respect to the plane 120 obtained through the camera of the external electronic device 110 and/or the electronic device 101. For example, since the first external object 131 and the second external object 132 are provided between the plane 120 and the electronic device 101, when viewed from the electronic device 101, the first external object 131 and the second external object 132 may at least partially occlude the one or more areas of plane 120.

According to an embodiment, the electronic device 101 may identify one or more areas in the plane 120, based on identifying that the plane 120 is partially occluded by the one or more external objects 130. According to an embodiment, the one or more areas may be referred as candidate display (or projection) areas. According to an embodiment, the electronic device 101 may select and/or segment the first area 141 and the second area 142, as another portion in the plane 120, that is different from a portion occluded by the one or more external objects 130. For example, referring to FIG. 1, the electronic device 101 may identify a first area 141 and the second area 142 in the plane 120 based on identifying the occluded areas corresponding to objects 131 and 132 in the plane 120. The first area 141 and the second area may have a quadrangular form. Hereinafter, an operation in which the electronic device 101 identifies the first area 141 and/or the second area 142 having the quadrangular form in the other area will be described, but the forms of the first area 141 and the second area 142 formed in the plane 120 by the electronic device 101 are not limited thereto. As such, according to an embodiment, the shape of the first area and the second area may be of another polygonal form and/or the shape of the first area and the second area may be different from each other. Also, according to an embodiment, a number of the display (or projection) areas is not limited to two.

According to an embodiment, the candidate display areas identified by the electronic device 101 may adjoin or be spaced apart from each other in the plane 120. For example, when the electronic device 101 identifies the candidate display areas in the plane 120, the candidate display areas identified by the electronic device 101 may adjoin or be spaced apart from each other in the plane 120. In the one or more candidate display areas, the electronic device 101 may identify the first area 141 having a first ratio and the quadrangular form. Here, the first ratio may be a preset ratio. For example, the first ratio may be a first aspect ratio of the first area 141. For example, the first aspect ratio may be a ratio of a length to width of the first area 141. In the one or more candidate display areas, the electronic device 101 may determine a second area 142 having a second ratio (e.g., a second aspect ratio). According to an embodiment, the second area 142 may have an area smaller than the first area 141. However, the disclosure is not limited thereto, and as such, according to an embodiment, the second area 142 may be equal to or larger than the first area 141. The second aspect ratio may be same or different from the first aspect ratio. According to an embodiment, the first area 141 may be referred to as a main area and the second area 142 may be referred to as a sub area. In an embodiment, the first area 141 may be referred to as a primary area and the second area 142 may be referred to as a secondary area. However, the disclosure is not limited thereto, and such, the number of candidate display areas is not limited to the first area 141 and the second area 142. Moreover, the designation of the first area 141 and the second area 142 is not limited to main area and sub area, respectively. As such, the candidate display areas (e.g., the first area 141 and the second area 142) may be configured in various manner in accordance with various application and service rendered by the electronic device 101.

According to an embodiment, the electronic device 101 may select the first area 141 and the second area 142 so that light emitted from the electronic device 101 avoids the one or more external objects 130 provided between the plane 120 and the electronic device 101 or provided on the plane 120. The electronic device 101 may select the first area 141 having a maximized extent (e.g., size) in the plane 120 that is not occluded by the one or more external objects 130. The electronic device 101 may select the second area 142 that is not occluded by the one or more external objects 130 and has the quadrangular form in the plane 120 from which the first area 141 is excluded. Since the first area 141 has the maximized extent, the second area 142 may have a smaller extent than the first area 141. An example of an operation in which the electronic device 101 selects the first area 141 and the second area 142 in the plane 120 according to an embodiment is described with reference to FIG. 3.

FIG. 1 illustrates an example scenario, in which, the electronic device 101 selects the first area 141 and the second area 142 in the plane 120 partially occluded by the first external object 131 and the second external object 132 according to an embodiment. In the scenario illustrated in FIG. 1, the electronic device 101 may display the media content in the first area 141 that is larger than the second area 142. The electronic device 101 may display a user interface (UI) associated with the media content in the second area 142 smaller than the first area 141. For example, the electronic device 101 may generate a first display screen (or a first layout) including the media content based on the shape and size of the first area 141, and the electronic device 101 may generate a second display screen (or a layout) including the UI based on the shape and size of the second area 142. For example, one or more characteristics of the first display screen (or the first layout) may be configured based on one or more characteristics of the first area 141, and one or more characteristics of the second display screen (or the second layout) may be configured based on one or more characteristics of the second area 141. The one or more characteristics of the first area 141, the second area 142, the first display screen and the second display screen may include, but is not limited to, a shape or a size. The electronic device 101 may display the media content and the UI substantially simultaneously. The displayed information is not limited to media content and UI, and as such, according to an embodiment, various types of information and/or content may be displayed.

In an embodiment, the media content displayed in the first area 141 by the electronic device 101 may be stored in the memory of the electronic device 101 or may be transmitted to the electronic device 101 from another electronic device. The another electronic device may be the external electronic device 110, which may include, but is not limited to, a mobile phone, a set-top box (STB), a PC, and/or a TV. The media content may include the image and/or the video. The media content may be streamed from a network connected by electronic device 101. The media content may include the video and a sound synchronized with the video. The media content may include a video standardized by a motion picture expert group (MPEG). According to an embodiment, the electronic device 101 may obtain the UI associated with the media content in a state of displaying the media content in the first area 141.

According to an embodiment, the electronic device 101 may display the UI associated with the media content in the second area 142 together with the media content displayed in the first area 141. The UI may include information on the media content and/or a channel for transmitting the media content. The UI may be selected from a plurality of preset UIs provided by a software application executed by the electronic device 101. The UI may include one or more executable objects for controlling the playback of videos in the media content based on the first area 141. The UI may be set by a content provider providing the media content.

In an embodiment, the UI displayed by the electronic device 101 in the second area 142 may have layout based on the form (e.g., width, height, and/or size) of the second area 142. The layout may be associated with the size and/or position of at least one visual object included in the UI. The layout may be an arrangement of a plurality of visual objects included in the UI. The visual object may mean a deployable object that may be provided on the screen for transmission and/or interaction of information, such as text, image, icon, video, button, checkbox, radio button, text box, and/or table. An operation of selecting the second area 142 and an operation of displaying a UI having layout based on the form of the second area 142 performed by the electronic device 101 may be related or interconnected. For example, the electronic device 101 may select the second area 142 based on a form suitable for displaying the UI associated with the media content in the plane 120 excluding the first area 141. According to an embodiment, an example operation of displaying the UI in the second area 142 by the electronic device 101 will be described with reference to FIGS. 4A to 4B.

According to an embodiment, the electronic device 101 may extract information from the media content. The electronic device 101 may display a UI including the information extracted from the media content in the second area 142. The information may include a scene in anyone timing of the video in the media content, or a text extracted from the scene. According to an embodiment, an example operation of displaying the UI in the second area 142 based on scene recognition for the video in the media content by the electronic device 101 will be described with reference to FIGS. 5A and 5B.

Although the operation of the electronic device 101 for selecting a plurality of areas (e.g., the first area 141 and the second area 142) in the plane 120 has been exemplarily described, the embodiment is not limited thereto. For example, the electronic device 101 may identify a plurality of planes to which the light output from the electronic device 101 may reach. Based on identifying the plurality of planes, the electronic device 101 may identify a plurality of areas that are not occluded by at least one external object and have the quadrangular form, such as the first area 141 and the second area 142, in the plurality of planes. An example of an operation in which the electronic device 101 identifies the plurality of areas in the plurality of planes will be described with reference to FIGS. 6A and 6B.

As described above, according to an embodiment, the electronic device 101 may identify the plane 120 capable of forming the screen based on the light output from the electronic device 101, by scanning an environment (e.g., the external space) adjacent to the electronic device 101. In case that the plane 120 is occluded by the one or more external objects 130, the electronic device 101 may select the plurality of areas (e.g., the first area 141 and the second area 142) having the quadrangular form, in a portion (e.g., a portion having a polygonal form) in the plane 120 that is not occluded by the one or more external objects 130. The electronic device 101 may additionally output information on the media content by displaying the media content and the UI associated with the media content on each of the plurality of areas. The information output together with the media content from the electronic device 101 may be used to enhance a user experience associated with the media content. The electronic device 101 may increase the amount of information displayed through the plane 120 by forming the plurality of areas in the plane 120. Since the amount of information is increased, the electronic device 101 may use the plane 120 more efficiently.

Figure 2:
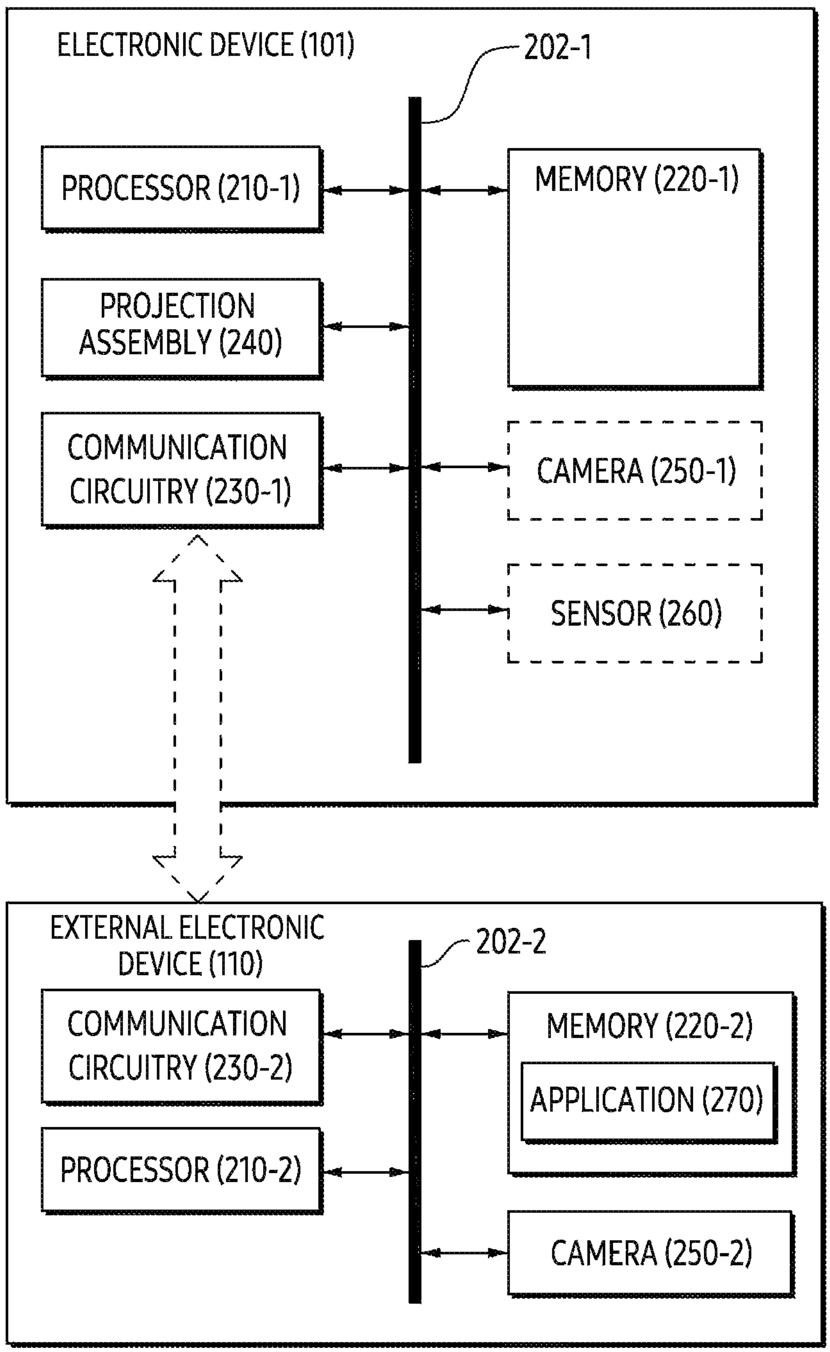
FIG. 2 illustrates an example of a block diagram of an electronic device according to an embodiment.

FIG. 2 illustrates an example of a block diagram of an electronic device 101 according to an embodiment. The electronic device 101 of FIG. 1 may be an example of the electronic device 101 of FIG. 2. An external electronic device 110 of FIG. 1 may be an example of the external electronic device 110 of FIG. 2. Referring to FIG. 2, the electronic device 101 and the external electronic device 110 may be connected to each other based on a wired network and/or a wireless network. The wired network may include a network such as the Internet, a local area network (LAN), a wide area network (WAN), an Ethernet, or a combination thereof. The wireless network may include a network such as long term evolution (LTE), 5G new radio (NR), wireless fidelity (WiFi), Zigbee, near field communication (NFC), Bluetooth, bluetooth low-energy (BLE), or a combination thereof. Although the electronic device 101 and the external electronic device 110 are illustrated as being directly connected, the electronic device 101 and the external electronic device 110 may be indirectly connected through an intermediate node (e.g., a router and/or an access point (AP)).

According to an embodiment illustrated in FIG. 2, the electronic device 101 may include, but is not limited to, at least one of a processor 210-1, a memory 220-1, a communication circuitry 230-1, a projection assembly, a camera 250-1, or a sensor 260. The processor 210-1, the memory 220-1, the communication circuitry 230-1, the projection assembly, the camera 250-1, and the sensor 260 may be electronically and/or operably coupled with each other by an electronical component such as a communication bus 202-1. Hereinafter, that hardware is operably coupled with each other may mean that a direct connection or an indirect connection between hardware is established by wire or wirelessly so that the second hardware is controlled by the first hardware among the hardware. Although illustrated based on different blocks, the embodiment is not limited thereto, a portion (e.g., at least a portion of the processor 210-1, the memory 220-1, and the communication circuitry 230-1) of the hardware of FIG. 2 may be included in a single integrated circuitry, such as a system on a chip (SoC). The types and/or numbers of hardware components included in the electronic device 101 are not limited to those illustrated in FIG. 2. For example, the electronic device 101 may include only a portion of the hardware components illustrated in FIG. 2.

According to an embodiment, the processor 210-1 of the electronic device 101 may include a hardware component for processing data based on one or more instructions. The hardware component for processing data may include, for example, an arithmetic and logic unit (ALU), a floating point unit (FPU), a field programmable gate array (FPGA), a central processing unit (CPU) and/or application processor (AP). The number of processors 210-1 may be one or more. For example, the processor 210-1 may have a structure of a multi-core processor such as a dual core, a quad core, or a hexa core.

According to an embodiment, the memory 220-1 of the electronic device 101 may include a hardware component for storing data and/or instructions inputted and/or output to the processor 210-1. The memory 220-1 may include, for example, volatile memory such as random-access memory (RAM) and/or non-volatile memory such as read-only memory (ROM). The volatile memory may include, for example, at least one of dynamic RAM (DRAM), static RAM (SRAM), Cache RAM, and pseudo SRAM (PSRAM). The non-volatile memory may include, for example, at least one of a programmable ROM (PROM), an erasable PROM (EPROM), an electrically erasable PROM (EEPROM), a flash memory, a hard disk, a compact disk, solid state drive (SSD) and an embedded multi media card (eMMC).

According to an embodiment, in the memory 220-1 of the electronic device 101, one or more instructions (or commands) indicating a calculation and/or operation to be performed on data by the processor 210-1 may be stored. A set of one or more instructions may be referred to as firmware, operating system, process, routine, sub-routine, and/or application. For example, the electronic device 101 and/or the processor 210-1 may perform at least one of the operations of FIGS. 7 to 8 when a set of a plurality of instructions distributed in the form of the operating system, firmware, driver, and/or application is executed. Hereinafter, that the application is installed in the electronic device 101 means that the one or more instructions provided in the form of the application are stored in the memory 220-1 of the electronic device 110, and the one or more applications are stored in a format (e.g., a file having an extension preset by the operating system of the electronic device 101) executable by the processor 210-1 of the electronic device 101.

According to an embodiment, the communication circuitry 230-1 of the electronic device 101 may include hardware for supporting transmission and/or reception of an electrical signal between the electronic device 101 and the external electronic device 110. As another electronic device connected through the communication circuitry 230-1 of the electronic device 101, only the external electronic device 110 is illustrated, but the embodiment is not limited thereto. The communication circuitry 230-1 may include, for example, at least one of a modem (MODEM), an antenna, and an optic/electronic (O/E) converter. The communication circuitry 230-1 may support transmission and/or reception of the electrical signal based on various types of protocols, such as ethernet, local area network (LAN), wide area network (WAN), wireless fidelity (WiFi), Bluetooth, bluetooth low energy (BLE), ZigBee, long term evolution (LTE), 5G new radio (NR) and/or sixth generation (6G).

According to an embodiment, the electronic device 101 may receive a media content by using the communication circuitry 230-1. For example, the electronic device 101 may wirelessly receive a signal for displaying the media content, based on a wireless communication protocol such as wireless display (WiDi) and/or Miracast, through the communication circuitry 230-1. For example, the electronic device 101 may receive the signal for displaying the media content by wire based on a wired communication protocol (or a wired interface) such as high-definition multimedia interface (HDMI), display port (DP), mobile high-definition link (MHL), digital visual interface (DVI), and/or D-subminiature (D-sub), by using the communication circuitry 230-1.

According to an embodiment, the projection assembly 240 of the electronic device 101 may include a plurality of hardware assembled to emit light representing pixels arranged in two dimensions. For example, the projection assembly 240 may include cathode-ray tubes (CRTs) for emitting light of each of the three primary colors in the color space, and a combination of lenses for enlarging the light emitted from each of the CRTs. For example, the projection assembly 240 may include a light source (e.g., a lamp) for emitting light, optical filters for segmenting the light into light paths corresponding to each of the three primary colors, liquid crystal display (LCD) panels provided on each of the optical paths, and a combination of prisms and/or lenses for synthesizing light output from the LCD panels. For example, the projection assembly 240 may include the light source for emitting light, an optical filter that selects any one of the three primary colors from the light, a digital mirror device (DMD) for adjusting the reflection on the primary color filtered by the optical filter, and a combination of lenses for enlarging the light reflected by the DMD. In terms of requiring projection of light for display of the screen, at least one of the exemplified combinations may be referred to as the projection assembly 240. In an embodiment, the electronic device 101 including the projection assembly 240 may be referred to as a projector or a beam projector. However, the disclosure is not limited thereto, and as such, according to an embodiment, the projection assembly 240 may include components configured to output a 3D image or a hologram. According to an embodiment, the assembly 240 may include two or more projectors to project separate images on different planes.

According to an embodiment, the camera 250-1 of the electronic device 101 may include one or more optical sensors (e.g., a charged coupled device (CCD) sensor or a complementary metal oxide semiconductor (CMOS) sensor) that generate an electrical signal representing color and/or brightness of light. A plurality of light sensors in the camera 250-1 may be provided in the form of a 2 dimensional array. The camera 250-1 may generate an image corresponding to light reaching the optical sensors of the 2 dimensional array and including a plurality of pixels arranged in 2 dimensions, by obtaining the electrical signal of each of a plurality of optical sensors substantially simultaneously. For example, photo data captured by using the camera 250-1 may mean an image obtained from the camera 250-1. For example, video data captured by using the camera 250-1 may mean a sequence of a plurality of images obtained from the camera 250-1 according to a preset frame rate.

According to an embodiment, the sensor 260 of the electronic device 101 may generate electronic information that may be processed by the processor 210-1 and/or the memory 220-1 from non-electronic information associated with the electronic device 101. For example, the sensor 260 may include a depth sensor for measuring a distance between the electronic device 101 and an external object. The depth sensor may include a UWB sensor (or UWB radar) that uses a wireless signal in a frequency band of an ultra wide band (UWB). The depth sensor may include a ToF sensor that measures a time-of-flight (ToF) of laser light and/or infrared light. The electronic device 101 may obtain a depth image including depth values arranged in 2 dimensions, by using the ToF sensor. The ToF sensor may include an infrared diode and a plurality of infrared light sensors that detect the intensity of infrared light and are arranged in the form of the 2 dimensional array. The electronic device 101 may obtain the depth image based on a time at which light emitted from the infrared diode is reflected from a subject and reaches at least one of the plurality of infrared light sensors, by using the ToF sensor. In addition to the depth sensor, the electronic device 101 may include a global positioning system (GPS) sensor (or a sensor based on a global navigation satellite system (GNSS), such as galileo, beidou, and compass for detecting a geographic location of the electronic device 101, an image sensor for detecting electromagnetic waves including light, a touch sensor, and/or an illuminance sensor.

According to an embodiment, the electronic device 101 may include an output device for outputting information in another form other than a visualized form. For example, the electronic device 101 may include a speaker for outputting an acoustic signal. For example, the electronic device 101 may include a motor for providing vibration-based haptic feedback.

Referring to FIG. 2, the external electronic device 110 connected to the electronic device 101 may include, but is not limited to, at least one of a processor 210-2, a memory 220-2, a communication circuitry 230-2, or a camera 250-2. The processor 210-2, the memory 220-2, the communication circuitry 230-2, and the camera 250-2 may be electronically and/or operably coupled with each other by communication bus 202-2. In an embodiment, the external electronic device 110 may be a terminal that is owned by a user. The terminal may include, for example, a personal computer (PC) such as a laptop and a desktop, and a smart accessory such as a smart phone, a smartpad, a tablet PC, a smartwatch, and a head-mounted device (HMD). The processor 210-2, the memory 220-2, the communication circuitry 230-2, and the camera 250-2 in the external electronic device 110 of FIG. 2 may correspond to the processor 210-1, the memory 220-1, the communication circuitry 230-1, and the camera 250-1 in the electronic device 101. In order to reduce repetition of description, among the descriptions of the processor 210-2, the memory 220-2, the communication circuitry 230-2, and the camera 250-2, descriptions overlapping the processor 210-1, the memory 220-1, the communication circuitry 230-1 and the camera 250-1 may be omitted.

According to an embodiment, an application 270 for communicating with the electronic device 101 may be installed in the external electronic device 110. The application 270 may be installed in the external electronic device 110 to exchange a signal and/or information between the electronic device 101 and/or the external electronic device 110. A processor 230-2 of the external electronic device 110 may control the communication circuitry 230-2 by executing the application 270. Through the communication circuitry 230-2, the external electronic device 110 may be connected to the communication circuitry 230-1 of the electronic device 101. In a state in which the application 270 is executed, a communication link may be established between the electronic device 101 and the external electronic device 110. The external electronic device 110 may obtain information to be transmitted to the electronic device 101 based on the execution of the application 270. For example, the electronic device 101 may transmit a first signal indicating to obtain information on one or more planes spaced apart from the electronic device 101, to the external electronic device 110, by executing the application 270. The first signal may be transmitted to the external electronic device 110 based on booting of the electronic device 101. The external electronic device 110 may execute the application 270 based on receiving the first signal. The external electronic device 110 may obtain at least one image for the one or more planes from the camera 250-2 based on the execution of the application 270. The external electronic device 110 may transmit a second signal including the information including the at least one image to the electronic device 101 through the communication circuitry 230-2, as a response to the first signal. An example of an operation of the electronic device 101 and the external electronic device 110 according to an embodiment will be described with reference to FIG. 9.

According to an embodiment, the processor 210-1 of the electronic device 101 may obtain information on one or more planes to which light emitted from the projection assembly 240 is to be projected based on the second signal received through the communication circuitry 230-1. The embodiment is not limited thereto, and the electronic device 101 including the camera 250-1 and/or the sensor 260 may obtain the information on the one or more planes by controlling the camera 250-1 and/or the sensor 260. The processor 210-1 of the electronic device 101 may display the media content in the first area (e.g., a first area 141 of FIG. 1) selected in the one or more planes based on the information. The media content may be transmitted from the external electronic device 110 connected through the communication circuitry 230-1 or may be stored in the memory 220-1. The processor 210-1 of the electronic device 101 may identify the second area (e.g., a second area 142 of FIG. 1) that is different from the first area in one or more planes based on the media content. The processor 210-1 of the electronic device 101 may display a UI associated with the media content, having layout based on the width and height of the second area, in the second area.

As described above, according to one embodiment, the electronic device 101 may obtain information on an external space where the light of the projection assembly 240 is to be propagated, by using the camera 250-2 in the external electronic device 110 and/or the camera 250-1 of the electronic device 101. From the information, the electronic device 101 may identify one or more planes on which the light is to be projected. The electronic device 101 may identify a plurality of areas on which the light is to be projected, in a portion not occluded by at least one external object (e.g., one or more external objects 130 of FIG. 1) in the one or more planes. The electronic device 101 may simultaneously or substantially simultaneously project different screens onto at least two areas among the plurality of areas. The electronic device 101 may increase the usage of the one or more planes based on the projection of the screens.

Hereinafter, with reference to FIG. 3, an operation in which the electronic device 101 selects a plurality of areas on which different screens (e.g., a UI including the media content and information associated with the media content) are to be displayed in a plane will be described according to an embodiment.

Figure 3:
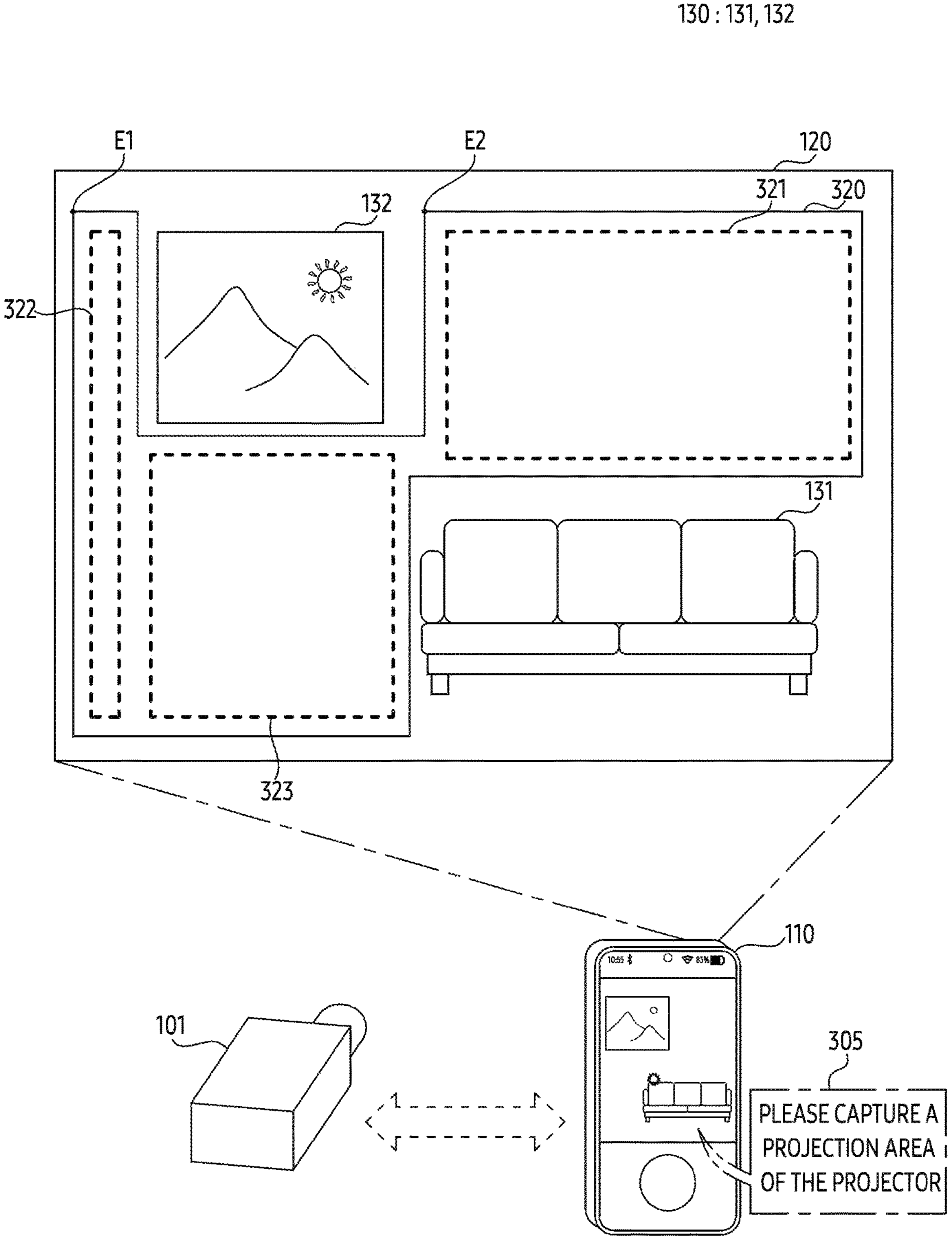
FIG. 3 illustrates an example of an operation of segmenting a plurality of areas on which light is to be projected by an electronic device, according to an embodiment.

FIG. 3 illustrates an example of an operation of segmenting a plurality of areas 321, 322, and 323 on which light is to be projected in a plane 120 by an electronic device 101, according to an embodiment. The electronic device 101 of FIG. 2 may include the electronic device 101 of FIG. 3. For example, an operation of the electronic device 101 described with reference to FIG. 3 may be performed by the electronic device 101 of FIG. 2 and/or a processor 210-1.

According to an embodiment, the electronic device 101 may obtain information on an external space in which light of a projection assembly (e.g., a projection assembly 240 of FIG. 2) in the electronic device 101 is emitted, by using a camera (e.g., a camera 250-1 of FIG. 2) in the electronic device 101. A direction of the camera in the electronic device 101 may be substantially parallel to a direction of the projection assembly in order to obtain the information. For example, the electronic device 101, may transmit a signal to an external electronic device including the camera (e.g., a camera 250-2 of FIG. 2) to obtain the information on the external space. The external device may include, but is not limited to, the external electronic device 110 of FIGS. 1 to 2. The external electronic device 110 may display a screen for obtaining the information in the display, based on the execution of an application (e.g., an application 270 of FIG. 2). For example, the external electronic device 110 may display a visual object 305 for guiding the capture of an image for the external space in the display. According to an embodiment, the external electronic device 110 may display a visual object 305 having the form of a pop-up window including a preset text (e.g., "PLEASE CAPTURE A PROJECTION AREA OF THE PROJECTOR") as illustrated in FIG. 3. However, the disclosure is not limited thereto, and as such, according to an embodiment, the projector may display a guidance layout (e.g., a blank screen or a white screen) corresponding to the projection area of the projector to assist the user to capture the projection area using the external electronic device. According to an embodiment, information for guiding the capture of the image may be output in a different manner. For example, the external electronic device 110 may output an audio to guide the capture of the image. The external electronic device 110 may obtain an image (e.g., an image where the plane 120 is captured) to be transmitted to the electronic device 101 based on an image capture input. The external electronic device 110 may transmit the image to the electronic device 101.

According to an embodiment, the information obtained by the electronic device 101 by using the camera of the external electronic device 110 and/or the electronic device 101 may include an image for the plane 120 to which light emitted from the projection assembly in the electronic device 101 is to be projected. The electronic device 101 may identify one or more external objects (e.g., a first external object 131 and/or a second external object 132) different from the plane 120 by performing object recognition on the image. The object recognition may include an operation of classifying a subject captured in the image into any one of preset categories (e.g., categories distinguished by a name of the subject). The object recognition may be performed based on an artificial neural network (ANN) executed by the electronic device 101. For example, the electronic device 101 may perform the object recognition based on the artificial neural network such as a convolution neural network (CNN) and/or long-short term memory (LSTM). That the electronic device 101 identifies the one or more external objects may include an operation of identifying positions of the one or more external objects in the image and/or at least a portion of the image occupied by the one or more external objects.

According to an embodiment, the electronic device 101 may separate the light path of the projection assembly from the one or more external objects identified by the image, in order to prevent light output from the projection assembly from being distorted by the three-dimensional (3D) form and/or color of the one or more external objects. For example, the electronic device 101 may identify a portion 320 different from a portion occluded by the first external object 131 and the second external object 132, in the plane 120. In an embodiment, the portion 320 may be referred to as a projectable portion. The electronic device 101 may use a camera of the electronic device 101 and/or the external electronic device 110 to identify the projectable portion. According to an embodiment, the electronic device 101 may identify the projectable portion based on coordinates of the one or more external objects 130 with respect to the plane 120. According to an embodiment, independent of the plane 120 having the form of a quadrangle, the form of the portion 320 identified by the electronic device 101 from the plane 120 may have a form of a polygon and/or a closed curve included in the plane 120. In an embodiment, in case that there is no external object such as the one or more external objects 130 between the plane 120 and the electronic device 101, the electronic device 101 may determine the entire plane 120 as the projectable portion.

Referring to FIG. 3, according to an embodiment, the electronic device 101 may extract the areas 321, 322, and 323 having a quadrangular form from the portion 320. For example, the electronic device 101 may segment the projectable portion such as the portion 320, based on a preset aspect ratio such as 16:9. In case that the projectable portion has the quadrangular form having the preset aspect ratio, the electronic device 101 may select a single area and may output a media content through the selected area. According to an embodiment, the electronic device 101 may identify a point in the upper left corner in the portion 320 having a polygonal form, such as the points E1 and E2. The electronic device 101 may extract the areas 321, 322, and 323 from the points E1 and E2 based on a quadrangular area extending toward the lower right corner. The electronic device 101 may identify the quadrangular areas extending from the point toward the lower right corner based on the preset aspect ratio. The electronic device 101 may determine an area having a maximum extent among the areas as the first area (e.g., the first area 141 of FIG. 1) where the media content is to be displayed. Hereinafter, it is assumed that the electronic device 101 determines the area 321 as the first area. For example, the electronic device 101 may project light for representing the media content, in the first area having the preset aspect ratio. In terms of the candidate used for determining the first area, the areas 321, 322, and 323 may be referred to as candidate areas. According to an embodiment, the electronic device 101 may identify the candidate areas having the preset aspect ratio in another portion 320 that is different from a portion occluded by the one or more external objects 130, in the plane 120. Among the candidate areas, the electronic device 101 may determine one candidate area (e.g., the area 321) having the maximum extent as the first area.

According to an embodiment, the electronic device 101 may select the second area (e.g., the second area 142 of FIG. 1) in which the UI associated with the media content to be displayed through the first area is to be displayed, among other areas 322 and 323, except for the area 321 determined as the first area, among the areas 321, 322, and 323 extracted in the portion 320. The electronic device 101 may assign a priority based on the media content, to each of the areas 322 and 323. The priority assigned by the electronic device 101 to the areas 322 and 323 may be associated with the media content to be displayed through the area 321 selected as the first area. For example, the priority of each of the areas 322 and 323 may be determined, based on the extent or the aspect ratio indicated by the media content. For example, in case that the priority of each of the areas 322 and 323 is determined based on the descending order of the extent, the priority of the area 323 may be higher than that of the area 322. For example, in case that the priority of each of the areas 322 and 323 is determined based on the ascending order of the difference between the width and the height, the priority of the area 323 may be higher than that of the area 322.

In an embodiment, the electronic device 101 may select the second area different from the first area, based on the priority assigned to each of the other areas 322 and 323 except for the area 321 determined as the first area. For example, the electronic device 101 may select the second area in which the UI associated with the media content displayed through the first area is to be displayed, from among the areas 322 and 323. In case that the area 323 among the areas 322 and 323 is selected as the second area, the electronic device 101 displays the display through the second area based on the width, the electronic device 101 may identify the UI to be displayed through the second area, based on the width, height, and/or extent of the area 323. For example, the electronic device 101 may select the UI to be displayed through the area 323, based on the media content and the width, height, and/or extent of the area 323, from among the preset UIs stored in a memory (e.g., the memory 220-1 of FIG. 2). The preset UI may represent information on the media content displayed through the area 321, based on one or more preset visual objects. The preset UI may include information for adjusting layout, based on at least one of the width, height, aspect ratio, and/or extent of the second area. Although an embodiment in which the electronic device 101 selects any one of the areas 322 and 323 as the second area is described, the embodiment is not limited thereto, and the electronic device 101 may display a plurality of UIs associated with the media content displayed through the first area through a plurality of other areas formed in the plane 120 excluding the first area.

According to an embodiment, the electronic device 101 may display the UI through the area 323 determined as the second area, in a state of displaying the media content through the area 321 determined as the first area. Based on the width, height, and/or aspect ratio of the area 323, the electronic device 101 may adjust the layout of the UI. Since the electronic device 101 adjusts the layout of the UI, the UI displayed through the area 323 may have a form suitable for the area 323. In terms of responding to the size of the second area, the UI displayed through the second area may be referred to as a responsive UI.

As described above, according to an embodiment, the electronic device 101 may obtain information associated with the plane 120 and/or the one or more external objects 130, by using the camera of the external electronic device 110 and/or the electronic device 101. Based on the information, the electronic device 101 may distinguish a plurality of areas (e.g., the areas 321, 322, and 323), in another portion (e.g., the projectable portion including the portion 320) that is different from a portion not occluded by the one or more external objects 130, in the plane 120. In the plurality of areas, the electronic device 101 may select the first area (e.g., the area 321 of FIG. 3) in which the media content is to be displayed and the second area (e.g., the area 323 of FIG. 3) in which the UI associated with the media content is to be displayed. In the plurality of areas, the electronic device 101 may determine the area 321 having the maximum extent and the preset aspect ratio as the first area in which the media content is to be displayed. In the portion 320, the other areas 322 and 323, which are different from the area 321, may be diverted to the second area for displaying the UI associated with the media content. In the portion 320, the electronic device 101 may increase the amount of use of the plane 120, by using the areas 321 and 323 selected as the first area and the second area.

Hereinafter, with reference to FIGS. 4A to 4B, an operation in which the electronic device 101 displays the media content and the UI associated with the media content, by using selected areas in the plane 120 will be described according to an embodiment.

Figure 4A:
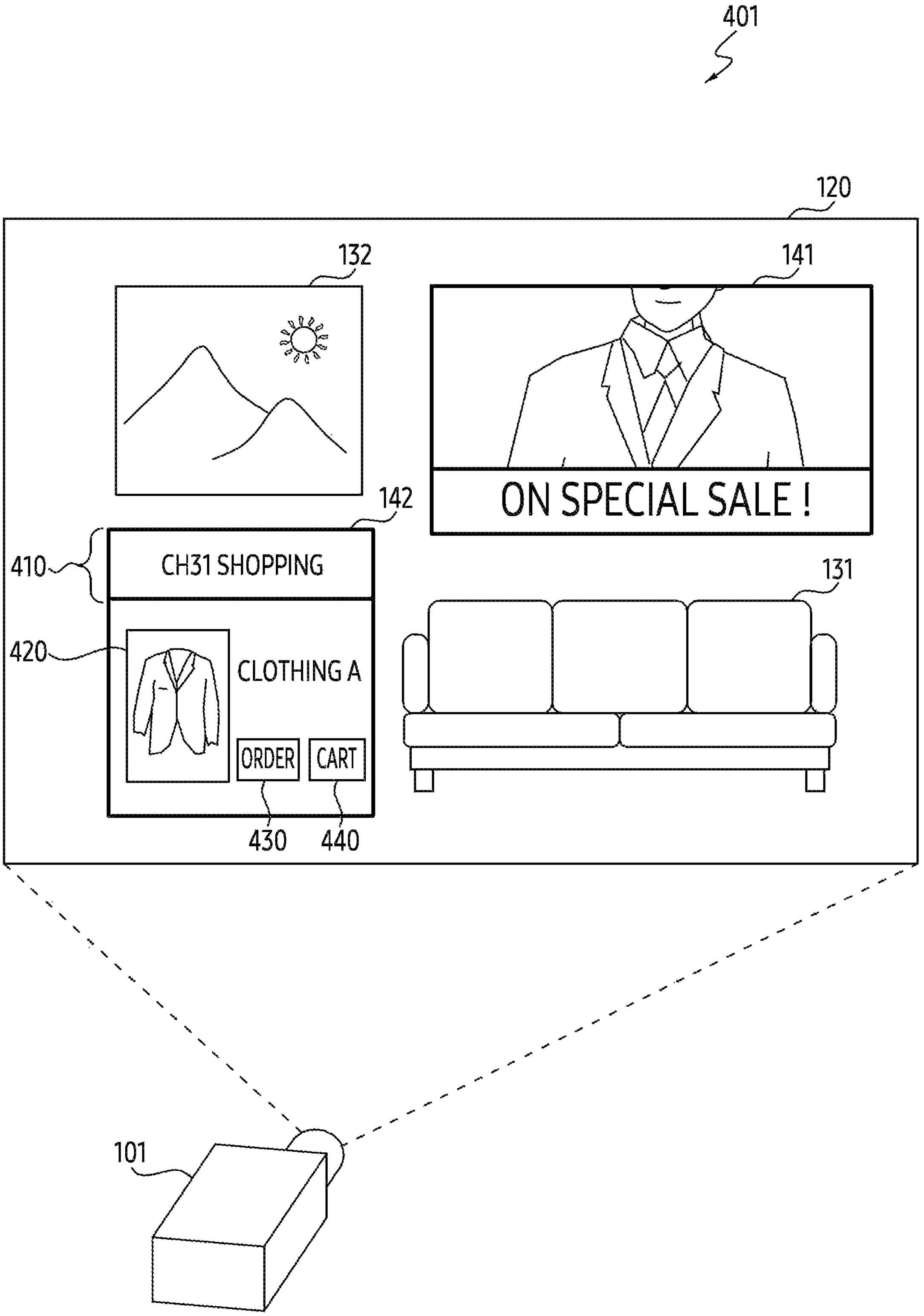
FIGS. 4A to 4B illustrate an example of an operation in which an electronic device displays a media content and a user interface (UI) associated with the media content through a plurality of areas according to an embodiment.
Figure 4B:
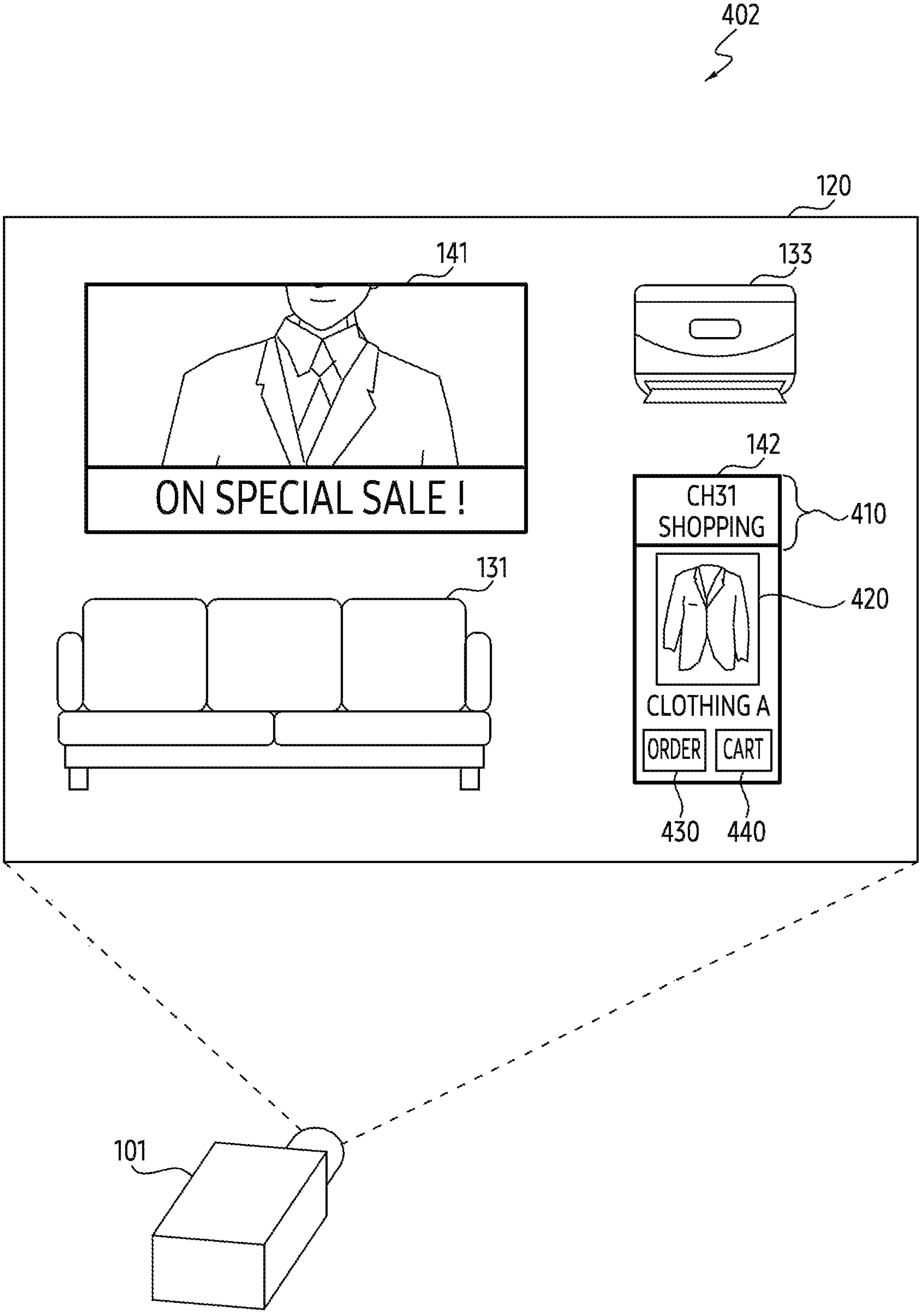

FIGS. 4A to 4B illustrate an example of an operation in which an electronic device 101 displays a media content and a user interface (UI) associated with the media content through a plurality of areas (e.g., a first area 141 and/or a second area 142) according to an embodiment. The electronic device 101 of FIG. 2 may include the electronic device 101 of FIGS. 4A to 4B. An operation of the electronic device 101 described with reference to FIGS. 4A to 4B may be performed by the electronic device 101 of FIG. 2 and/or a processor 210-1.

FIGS. 4A to 4B illustrate example scenarios 401 and 402 in which the electronic device 101 displays the media content and UI by simultaneously controlling the first area 141 and the second area 142 according to an embodiment. In a first scenario 401 illustrated in FIG. 4A, the electronic device 101 may identify a plurality of candidate areas in another portion in the plane 120 different from a portion (or one or more occluded areas) in the plane 120 occluded by a first external object 131 and a second external object 132. The plurality of candidate areas may have aspect ratios same or different from each other. The electronic device 101 may select a candidate area having a maximum extent among the plurality of candidate areas as the first area 141. The electronic device 101 may display the media content in the first area 141. The electronic device 101 may have obtained the media content through a communication circuitry (e.g., a communication circuitry 230-1 of FIG. 2). Based on the positional relationship between the first area 141 and the electronic device 101, the electronic device 101 may display the media content having a form suitable for the form of the first area 141, by executing at least one of functions such as keystone adjustment and/or lens shift. In an embodiment, the media content displayed through the first area 141 may include a preset screen (e.g., home screen) provided by the STB, TV video, and/or multi-view (or multi-window) in which different screens are combined. Hereinafter, it is assumed that the electronic device 101 displays the media content for home shopping in the first area 141, in the first and second example scenarios 401 and 402 of FIGS. 4A to 4B. The media content may be transmitted to the electronic device 101 from a server of a content provider, through the STB connected to the electronic device 101.

In the first scenario 401 illustrated in FIG. 4A, the electronic device 101 may identify the second area 142 in the plane 120, in which the UI is to be displayed, based on a condition corresponding to the UI associated with media content. The second area 142 may be in the other portion in the plane 120 in which the first area 141 is segmented. The condition may be selected from among a first condition set by deviation between the width and the height and/or a second condition set based on the extent. The first condition and the second condition may be present condition. The electronic device 101 may extract the candidate areas having a quadrangular form from the other portion from which the first area 141 is excluded. Among the candidate areas, the electronic device 101 may select a candidate area having the maximum extent or a minimum deviation between the width and the height, as the second area 142.

In FIG. 4A, the first scenario 401 in which the electronic device 101 displays the UI associated with the media content in the second area 142 is illustrated. Through the UI, the electronic device 101 may display information in a specific timing (e.g., a current timing) of the media content displayed through the first area 141. The electronic device 101 may store a plurality of preset UIs for representing the information. The plurality of preset UIs may include at least one of a UI for displaying a notification message, a UI having a form of a pop-up window, a UI for exchanging information with another electronic device different from the electronic device 101 based on the internet of things (IOT), and/or a UI for displaying information on electronic device 101 such as a dashboard. Among the plurality of preset UIs, the electronic device 101 may identify the UI displayed through the second area 142, based on the media content displayed through the first area 141 and/or a signal transmitted from the content provider providing the media content.

In the first scenario 401 illustrated in FIG. 4A, according to an embodiment, the electronic device 101 may display a UI including information associated with the home shopping in the second area 142, while displaying the media content for the home shopping in the first area 141. The UI may be selected from among the plurality of preset UIs stored in the electronic device 101. The electronic device 101 may display a visual object 410 including information on a channel of the media content displayed in the first area 141, in the UI displayed through the second area 142. In the visual object 410, the electronic device 101 may display information (e.g., channel number and/or channel name) indicating the channel. The electronic device 101 may display information on a product included in the media content, in the UI displayed through the second area 142. For example, the electronic device 101 may display a visual object 420 including an image representing the product. The electronic device 101 may display a text including the name (e.g., “clothing A”) of the product, in the UI. The electronic device 101 may display visual objects 430 and 440 for transaction of the product, in the UI. For example, the electronic device 101 may include a preset text such as “order” and may execute a function for trading (e.g., purchasing) a product corresponding to the UI, through the visual object 430 having the form of a button. For example, the electronic device 101 may include a preset text such as “cart” and may execute a function for adding the product corresponding to the UI to a list (e.g., cart) formed for collective transaction of a plurality of products, through the visual object 440 having the form of the button.

According to an embodiment, that the electronic device 101 displays the UI based on the extent and/or the aspect ratio of the second area 142 may include an operation of changing the layout of one or more visual objects (e.g., the visual objects 410, 420, 430, and 440) included in the UI. The layout may include a position, form, size and/or arrangement of the one or more visual objects. FIG. 4B illustrates a second scenario 402 for selecting each of the first area 141 and the second area 142 in which the media content and the UI are to be displayed, in the portion in the plane 120 where the electronic device 101 is not occluded by the first external object 131 and/or the third external object 133.

In the second scenario 402 in FIG. 4B, according to an embodiment, the electronic device 101 may select the first area 141 having a maximized extent, based on the candidate areas having the aspect ratio indicated by the media content. Based on the selection of the first area 141, the electronic device 101 may select the second area 142 in which the UI associated with the media content is to be displayed, in another portion in the plane 120 different from the first area 141. The other portion may mean a portion in the plane 120 that is not occluded by the first external object 131 and the third external object 133. Referring to FIG. 4B, according to an embodiment, the UI displayed in the second area 142 by the electronic device 101 by using the aspect ratio is exemplarily illustrated. The UI may include the visual objects 410, 420, 430, and 440 of FIG. 4A.

Referring to the first scenario 401 and the second scenario 402 in FIGS. 4A to 4B, layout of the UI including the visual objects 410, 420, 430, and 440 may be different. According to an embodiment, the electronic device 101 may change the UI in the second area 142, based on the form and/or layout of the second area 142. For example, the UI in the second area 142 may have layout dependent on at least one of the width, height, and/or ratio (e.g., aspect ratio) of the width and height of the second area 142. Referring to FIG. 4A, in the first scenario 401 in which the width of the second area 142 is longer than the height of the second area 142, the electronic device 101 may continuously display the visual objects 420, 430, and 440, along a direction perpendicular to a direction of the height of the second area 142, in the second area 142. Referring to FIG. 4B, in the second scenario 402 in which the height of the second area 142 is longer than the width of the second area 142, the electronic device 101 may continuously display the visual objects 420, 430, and 440, along a direction parallel to a direction of the height of the second area 142, in the second area 142. For example, the visual object 420 and the visual objects 430 and 440 may be sequentially displayed, along the direction of the height of the second area 142.

In an embodiment, that the electronic device 101 displays the media content and the UI in different areas on the plane 120 is not limited to the embodiment of FIGS. 1 to 3 and 4A to 4B in which the first area 141 to the second area 142 are segmented. For example, in case that the electronic device 101 fails to identify the second area 142 different from the first area 141 in the plane 120, the electronic device 101 may display the second area 142 on the media content displayed through the first area 141 as overlapping.

As described above, according to an embodiment, the electronic device 101 may display the UI including a plurality of visual objects 410, 420, 430, and 440 arranged based on the form of the second area 142, in the second area 142 of the plane 120 that is not occluded by the external object (e.g., the first external object 131 to the third external object 133) such as furniture. For example, the UI and/or the plurality of visual objects 410, 420, 430, and 440 in the UI may be determined by the media content displayed through the first area 141. For example, the position and/or size of the plurality of visual objects 410, 420, 430, and 440 in the second area 142 may be determined by the form of the second area 142.

Although the first scenario 401 and the second scenario 402 displaying UI including information associated with the home shopping are illustrated as an example, in a state in which the electronic device 101 displays the media content for the home shopping, the disclosure is not limited thereto. While displaying another type of the media content different from the home shopping, the electronic device 101 may display a UI based on the other type of the media content. For example, while displaying a media content classified as a movie, the electronic device 101 may display information (e.g., the title, actors, running time, ticketing information and/or script of the movie) associated with the movie. For example, while displaying a media content classified as news, the electronic device 101 may display information (e.g., news title) associated with the news. For example, while displaying a media content classified as a sports game, the electronic device 101 may display information described later with reference to FIGS. 5A to 5B.

According to an embodiment, the electronic device 101 may obtain the UI to be displayed through the second area 142, by extracting text included in the media content. Hereinafter, an example of an operation of displaying the UI based on the text by the electronic device 101 according to an embodiment will be described with reference to FIGS. 5A to 5B.

Figure 5A:
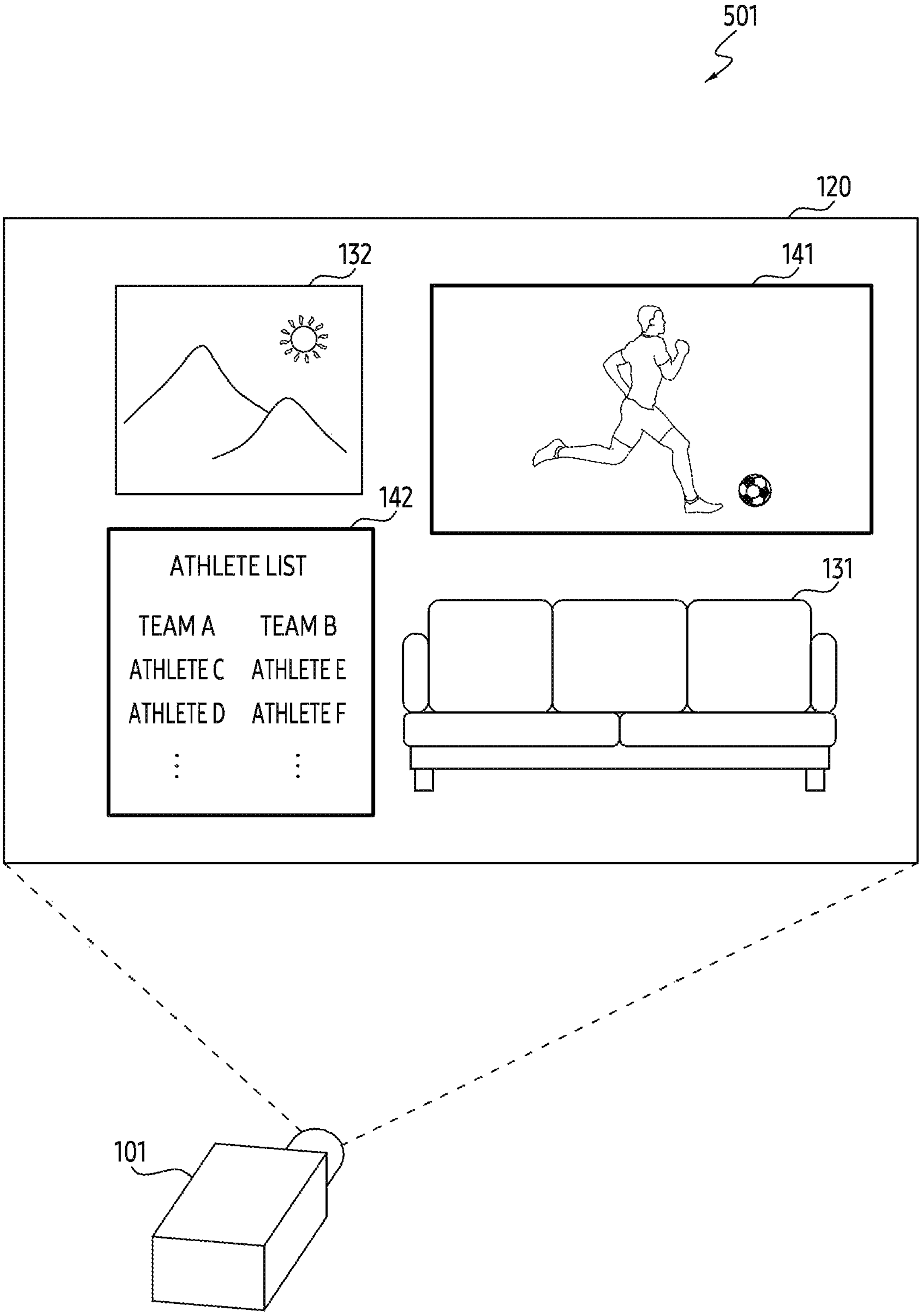
FIGS. 5A to 5B illustrate an example of an operation of displaying a UI based on the size of a second area smaller than the first area while an electronic device displays media content by using the first area, according to an embodiment.
Figure 5B:
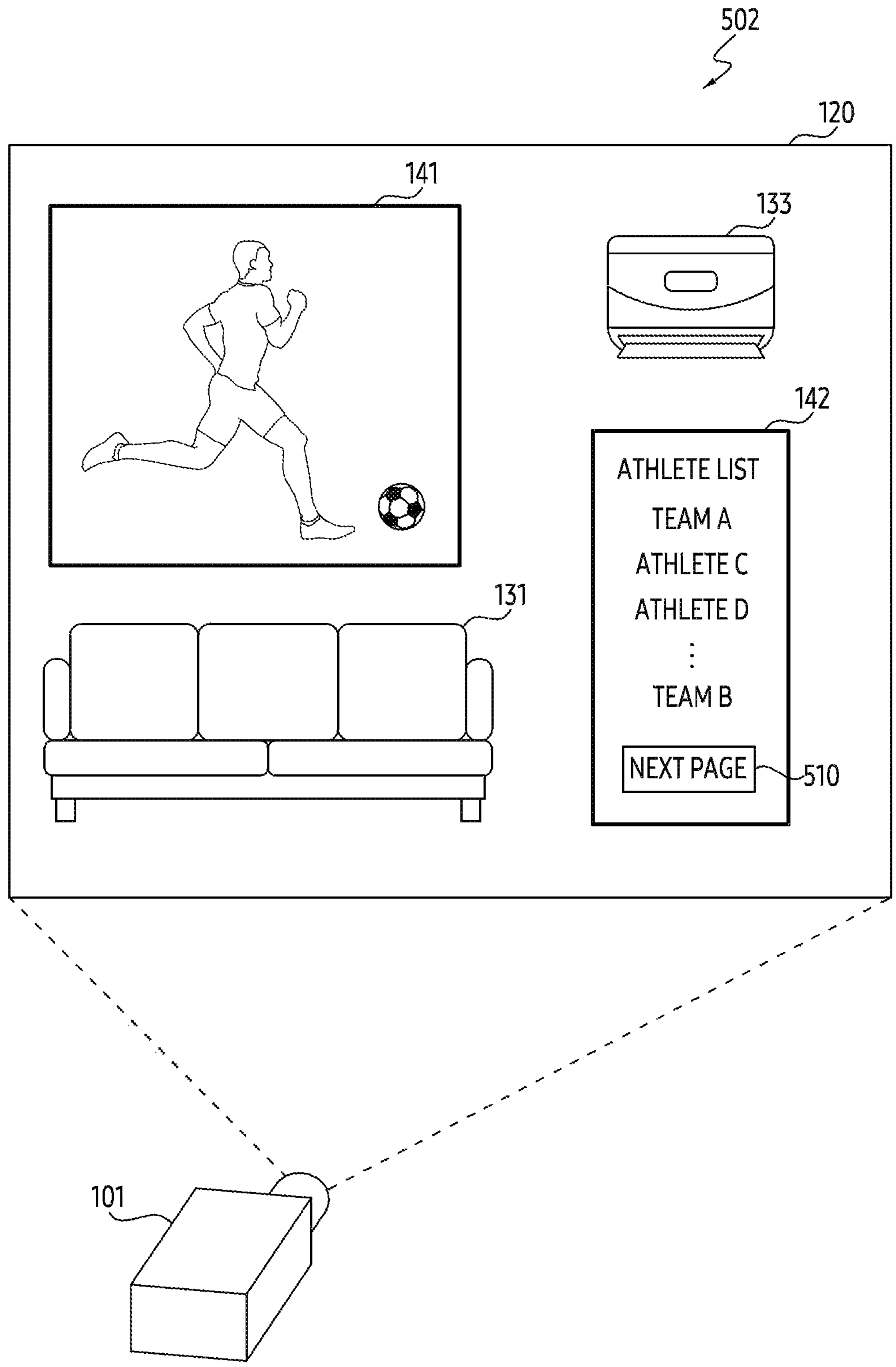

FIGS. 5A to 5B illustrate an example of an operation of displaying a UI based on the size of a second area 142 smaller than the first area 141 while an electronic device 101 displays media content by using the first area 141, according to an embodiment. The electronic device 101 of FIG. 2 may include the electronic device 101 of FIGS. 5A to 5B. An operation of the electronic device 101 described with reference to FIGS. 5A to 5B may be performed by the electronic device 101 of FIG. 2 and/or a processor 210-1.

FIGS. 5A and 5B illustrate a third scenario 501 and a fourth scenario 502 in which the electronic device 101 displays a media content and a UI by simultaneously controlling a first area 141 and a second area 142, according to an embodiment. In the third scenario 501, the electronic device 101 may identify another portion (e.g., a portion in a plane 120 not occluded by a first external object 131 and a second external object 132) different from a portion in the plane 120 occluded by the first external object 131 and the second external object 132. In the other portion, the electronic device 101 may select the first area 141 having a preset aspect ratio and the second area 142 different from the first area 141. The first area 141 may correspond to a candidate area having a maximum extent, among a plurality of candidate areas segmented in the other portion and having the preset aspect ratio. The second area 142 may correspond to a quadrangular area having the maximum extent in the other portion excluding the first area 141 or may be matched with a quadrangle having a minimum difference in width and height among quadrangles that may be formed in the other portion excluding the first area 141.

According to an embodiment, the electronic device 101 may perform scene recognition on the media content (e.g., live video and/or over-the-top (OTT) video) displayed through the first area 141. The electronic device 101 may obtain a UI to be displayed through the second area 142, based on the scene recognition. For example, the electronic device 101 may obtain the UI, based on any one of frames included in a video of the media content. For example, in the third scenario 501 in which the electronic device 101 projects the media content associated with the sports game onto the first area 141, the electronic device 101 may identify a frame including information on one or more athletes associated with the sports event among the frames in the media content. The electronic device 101 may display the identified frame through the second area 142, in the third scenario 501. The second area 142 may have the aspect ratio (e.g., the preset aspect ratio of the first area 141) of the frame. The embodiment is not limited thereto, and for example, the electronic device 101 may display a UI including the subtitle identified based on the scene recognition through the second area 142, while projecting media content including the subtitle onto the first area 141.

According to an embodiment, the electronic device 101 may determine layout of a UI in which information extracted from the media content is to be displayed, based on the aspect ratio and/or size of the second area 142. Referring to FIG. 5B, the fourth scenario 502, which is different from the third scenario 501 of FIG. 5A in which the width of the second area 142 is longer than the height of the second area 142, is illustrated. It is assumed that the height of the second area 142 is longer than the width of the second area 142, in the fourth scenario 502. Since the height of the second area 142 is longer than the width of the second area 142, the aspect ratio of the second area 142 may be different from the aspect ratio of the first area 141. In case that the electronic device 101 identifies the UI to be displayed through the second area 142 based on a frame in the video of the media content, since the aspect ratios of the first area 141 and the second area 142 are different, displaying the frame in the second area 142 may cause distortion of the frame. According to an embodiment, in case that the aspect ratios of the first area 141 and the second area 142 are different, or the difference between the aspect ratios exceeds the preset difference, the electronic device 101 may display text extracted from the frame used to obtain the UI in the second area 142.

Referring to FIG. 5B, in the fourth scenario 502, according to an embodiment, the electronic device 101 may display text extracted from the media content in the second area 142 based on optical character recognition (OCR). The electronic device 101 may display a visual object 510 for displaying another portion different from a portion of the text displayed in the second area 142, in the second area 142, while displaying a portion of the text in the second area 142. For example, the electronic device 101 may display the visual object 510 having the form of a button including preset text that guides the display of the other portion, such as “next page”. In response to an input indicating the selection of the visual object 510, the electronic device 101 may display the other portion of the text in the second area 142.

As described above, according to an embodiment, the electronic device 101 may obtain the UI to be displayed through the second area 142 and/or information to be included in the UI, based on frames in the media content displayed through the first area 141. For example, in case that a parameter indicating the selection of at least one of a plurality of preset UIs stored in the electronic device 101 is not identified in the media content, the electronic device 101 may obtain the UI to be displayed through the second area 142 by performing the scene recognition on the media content. For example, the electronic device 101 may obtain text to be displayed through the second area 142, based on the OCR for at least one of frames in the media content. Based on the aspect ratio of the second area 142, the electronic device 101 may selectively project any one of a frame used to obtain the text or the text among frames in the media content onto the second area 142.

According to an embodiment, the electronic device 101 may identify the first area 141 in which the media content is to be displayed and the second area 142 in which the UI associated with the media content is to be displayed, by recognizing a plurality of planes including the plane 120. For example, the first area 141 and the second area 142 may be selected from each of the plurality of planes. Hereinafter, with reference to FIGS. 6A and 6B, an example of an operation in which the electronic device 101 identifies the first area 141 and/or the second area 142 by using the plurality of planes will be described.

Figure 6A:
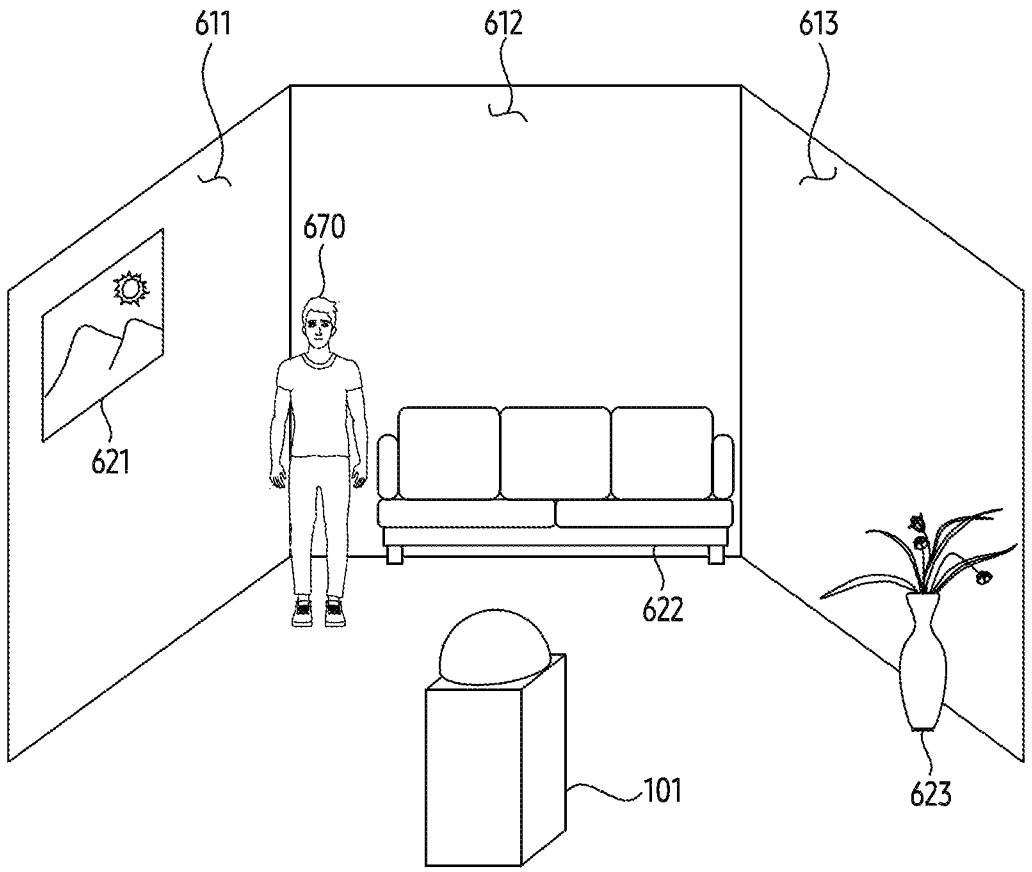
FIGS. 6A and 6B illustrate an example of an operation of segmenting a plurality of areas in which a media content and a UI are to be displayed, respectively, in each of a plurality of planes by an electronic device according to an embodiment.
Figure 6B:
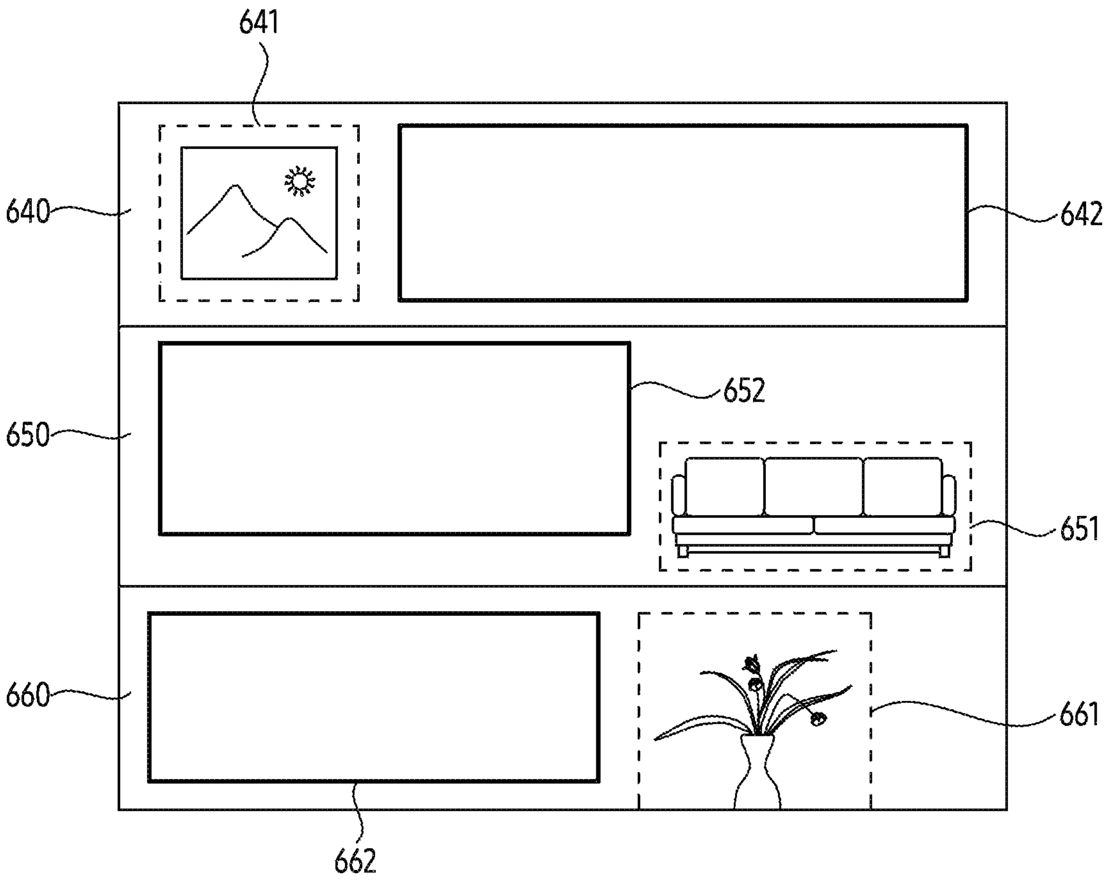

FIGS. 6A and 6B illustrate an example of an operation of segmenting a plurality of areas 642, 652, and 662 in which a media content and a UI are to be displayed, respectively, in each of a plurality of planes (e.g., a first plane 611 to a third plane 613) by an electronic device 101 according to an embodiment. The electronic device 101 of FIG. 2 may include the electronic device 101 of FIG. 6A. An operation of the electronic device 101 described with reference to FIGS. 6A and 6B may be performed by the electronic device 101 of FIG. 2 and/or a processor 210-1.

Referring to FIG. 6A, according to an embodiment, the electronic device 101 may recognize an external space including the plurality of planes, by using a camera (e.g., a camera 250-1 of FIG. 2). The plurality of planes may include a first plane 611, a second plane 612 and a third plane 613. The electronic device 101 may be a beam projector capable of emitting light toward all directions (e.g., 360°). According to an embodiment, the electronic device 101 may obtain information on the external space to which light output through a projection assembly (e.g., a projection assembly 240 of FIG. 2) may reach, by using the camera.

According to an embodiment, the electronic device 101 may obtain at least one image including information on all directions. FIG. 6B illustrates an example depiction of images including each of the first plane 611, the second plane 612, and the third plane 613 obtained by the electronic device 101 (or captured by the camera of the electronic device 101). The images may include a first image 640, a second image 650, and a third image 660. In an example scenario illustrated in FIG. 6A, a plurality of external objects (e.g., a first external object 621, a second external object 622, and a third external object 623) are provided between the electronic device 101 and the plurality of planes. Accordingly, as illustrated in FIG. 6B, the electronic device 101 may obtain a plurality of areas on which a screen is to be projected in the first plane 611, the second plane 612, and the third plane 613, based on occluded areas corresponding to the plurality of external objects, in the images 640, 650, and 660.

Referring to FIG. 6B, from the first image 640 for the first plane 611, the electronic device 101 may identify an area 641 in the first plane 611 occluded by the first external object 621. The electronic device 101 may identify the area 642 different from the area 641 in the first plane 611. From the second image 650 for a second plane 612, the electronic device 101 may identify an area 651 in the second plane 612 occluded by the second external object 622. The electronic device 101 may identify the area 652 that does not overlap the area 651 in the second plane 612. From the third image 660 for the third plane 613, the electronic device 101 may identify an area 661 in the third plane 613 occluded by the third external object 623. The electronic device 101 may identify the area 662 different from the area 661 in the third plane 613.

According to an embodiment, the electronic device 101 may select a first area in which the media content is to be projected and a second area in which a UI associated with the media content is displayed, from among the areas 642, 652, and 662 that are not occluded by the first external object 621, the second external object 622, and the third external object 623, in a plurality of planes 611, 612, and 613. The electronic device 101 may identify the first area and the second area, based on at least one plane adjacent to a user 670 among the plurality of planes 611, 612, and 613, based on identifying the user 670 adjacent to the plurality of planes 611, 612, and 613. For example, referring to FIG. 6A, the electronic device 101 may identify that the user 670 is adjacent to the first plane 611 and the second plane 612. Based on identifying that the user 670 is adjacent to the first plane 611 and the second plane 612, the electronic device 101 may select the first area and the second area from among the area 642 identified from the first plane 611 and the area 652 identified from the second plane 612. For example, a larger area among the areas 642 and 652 may be selected as the first area, and a smaller area among the areas 642 and 652 may be selected as the second area. However, the disclosure is not limited thereto, and as such, the first area and the second area may be performed in a different manner. According to an embodiment, the electronic device 101 may identify a first candidate plane, among the first plane 611, the second plane 612, and the third plane 613, that is the closest plane to the user 670, and a second candidate plane, among the first plane 611, the second plane 612, and the third plane 613, that is the second closest plane to the user 670. The electronic device 101 may select a first area and a second area from among the first candidate plane and the second candidate plane. According to an embodiment, the electronic device may identify that the user is moving. Based on identifying the movement of the user 670, the electronic device 101 may reselect the first area and the second area among the areas 642, 652, and 662 based on a new position of the moved user 670.

As described above, according to an embodiment, in case of projecting light toward the plurality of planes, the electronic device 101 may select the first area to which the media content is to be projected and the second area to which the UI associated with the media content is to be projected, based on the projectable portion of each of the plurality of planes and the position of the user 670 with respect to the plurality of planes. Since the light is projected to the plurality of areas, the electronic device 101 may increase amount of usage of the plurality of planes. Based on the increased amount of usage, the electronic device 101 may improve a user experience.

Hereinafter, an operation of the electronic device 101 according to an embodiment will be described with reference to FIGS. 7 to 9.

Figure 7:
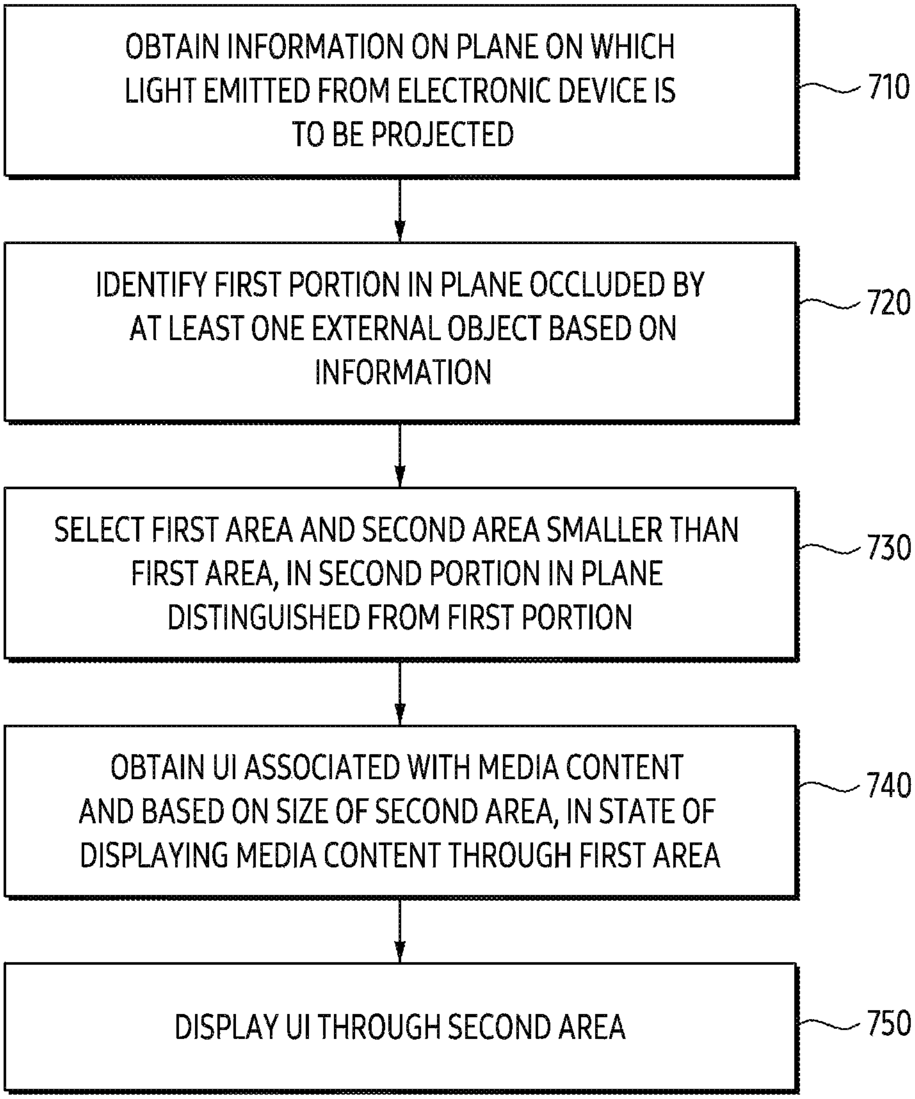
FIG. 7 illustrates an example of a flowchart for an electronic device according to an embodiment.

FIG. 7 illustrates an example of a flowchart of a method performed by an electronic device according to an embodiment. An electronic device 101 of FIG. 2 may include the electronic device of FIG. 7. For example, an operation of the electronic device described with reference to FIG. 7 may be performed by the electronic device 101 and/or a processor 210-1 of FIG. 2.

In operation 710, the method may include obtaining information on a plane on which light emitted from the electronic device is to be projected. According to an embodiment, the electronic device may obtain information on a plane on which light emitted from the electronic device is to be projected. The information may include an image obtained through a camera (e.g., a camera 250-1 of FIG. 2)

of the electronic device. The information may include information obtained by using a sensor (e.g., a sensor 260 of FIG. 2) of the electronic device. The information obtained by using the sensor may include, for example, a depth image obtained by using a depth sensor. The information may be obtained from an external electronic device (e.g., an external electronic device 110 of FIGS. 1 to 2) through a communication circuitry (e.g., a communication circuitry 230-1 of FIG. 2). For example, in order to obtain the information, the electronic device may transmit a first signal indicating a request for the information to the external electronic device. The electronic device may identify the information based on a second signal transmitted from the external electronic device in response to the first signal.

In operation 720, the method may include identifying a first portion in the plane occluded by at least one external object based on the information of the operation 710. According to an embodiment, the electronic device may identify a first portion in the plane occluded by at least one external object based on the information of the operation 710. The electronic device may identify at least one external object provided between the electronic device and the plane, based on the information of the operation 710. The electronic device may identify the first portion in the plane occluded by the at least one external object. The first portion may be a portion to which light (e.g., light emitted from a projection assembly 240 of FIG. 2) emitted from the electronic device is not able to reach.

In operation 730, the method may include selecting a first area and a second area smaller than the first area, in a second portion in a plane different from the first portion. According to an embodiment, the electronic device may select a first area and a second area smaller than the first area, in a second portion in a plane different from the first portion. The electronic device may determine a candidate area having a maximum extent from among candidate areas having a quadrangular form having a preset aspect ratio (e.g., 16:9) as the first area. The electronic device may select the second area based on a condition indicated by a media content to be displayed through the first area, in the second portion from which the first area is excluded. For example, based on the conditions, the electronic device may determine a candidate area having a minimum difference in width and height, among the candidate areas having the quadrangular form formed in the second portion from which the first area is excluded, as the second area. For example, based on the condition, the electronic device may determine a candidate area having the maximum extent among the candidate areas having the quadrangular form formed in the second portion from which the first area is excluded, as the second area.

In operation 740, the method may include obtaining a UI associated with the media content and based on the size of the second area, in a state of displaying the media content through the first area. According to an embodiment, the electronic device may obtain a UI associated with the media content and based on the size of the second area, in a state of displaying the media content through the first area. The electronic device may select a preset UI associated with the media content from among a plurality of preset UIs. The electronic device may obtain the UI of the operation 740 by adjusting the layout of the preset UI based on the width, height, and/or aspect ratio of the second area of the operation 730. According to an embodiment, the electronic device may extract information from the media content, based on scene recognition and/or OCR for the media content. The electronic device may obtain a UI for displaying the extracted information. The electronic device may obtain a UI including the information and having a layout based on the width, height, and/or aspect ratio of the second area.

In operation 750, the method may include displaying the UI through the second area. According to an embodiment, the electronic device may display the UI through the second area. The electronic device may display the UI through the second area, in a state of displaying the media content through the first area of the operation 740. Based on the operations 740 and 750, the electronic device may simultaneously display the media content and the UI.

Figure 8:
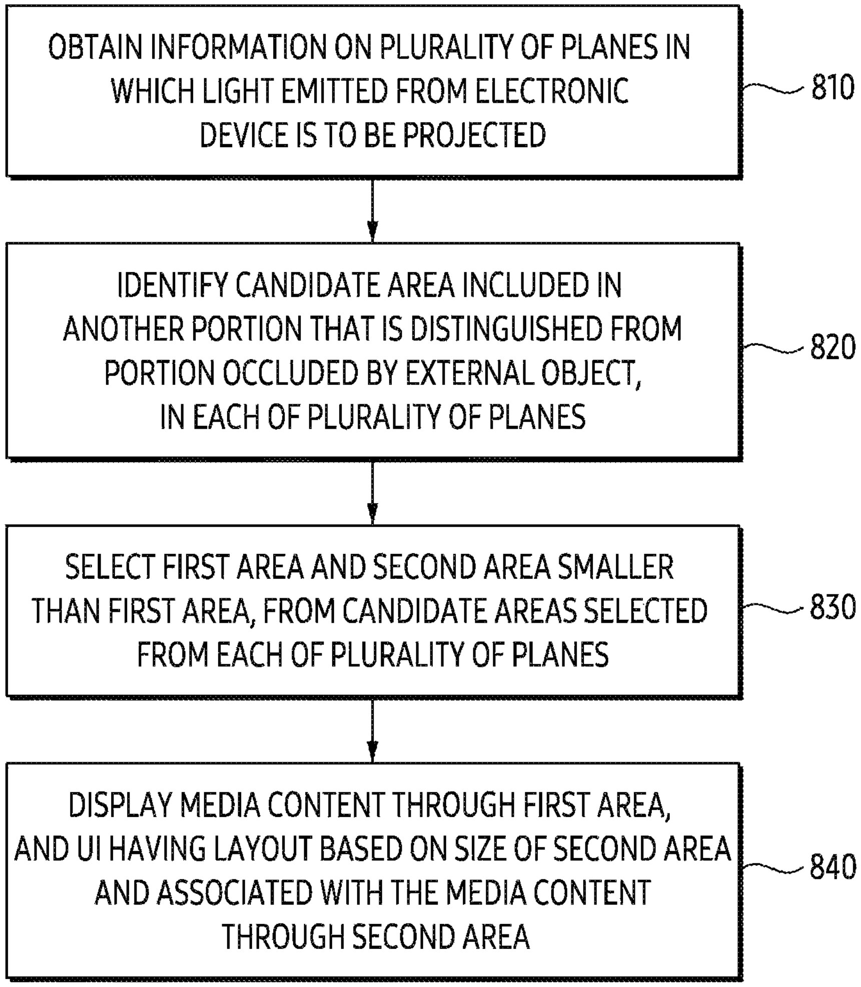
FIG. 8 illustrates an example of a flowchart for an electronic device according to an embodiment.

FIG. 8 illustrates an example of a flowchart of a method performed by an electronic device according to an embodiment. An electronic device 101 of FIG. 2 may include the electronic device of FIG. 8. For example, an operation of the electronic device described with reference to FIG. 8 may be performed by the electronic device 101 and/or a processor 210-1 of FIG. 2.

In operation 810, the method may include obtaining information on a plurality of planes in which light emitted from the electronic device is to be projected. According to an embodiment, the electronic device may obtain information on a plurality of planes in which light emitted from the electronic device is to be projected. For example, the electronic device may obtain information on the plurality of planes, by using a camera (e.g., a camera 250-1 of FIG. 2) and/or a sensor (e.g., a sensor 260 of FIG. 2). The information may include one or more images (e.g., images 640, 650, and 660 of FIG. 6B) in which the plurality of planes are captured. According to an embodiment, the electronic device may obtain information on the plurality of planes (e.g., a first plane 611, a second plane 612, and a third plane 613 of FIG. 6A) included in an external space in which light emitted from a projection assembly (e.g., a projection assembly 240 of FIG. 2) may reach.

In operation 820, the method may include identifying a candidate area included in another portion that is different from a portion occluded by an external object, in each of the plurality of planes. According to an embodiment, the electronic device may identify a candidate area included in another portion that is different from a portion occluded by an external object, in each of the plurality of planes. For example, the electronic device may identify at least one external object provided between the plurality of planes and the electronic device, based on the information of the operation 810. The electronic device may identify the portion occluded by at least one external object, based on one or more images in which the plurality of planes are captured. For example, in each of the plurality of planes, the other portion different from the portion may correspond to a portion to which light emitted from the projection assembly of the electronic device may reach.

In operation 830, the method may include selecting a first area and a second area smaller than the first area, from candidate areas selected from each of the plurality of planes. According to an embodiment, the electronic device may select a first area and a second area smaller than the first area, from candidate areas selected from each of the plurality of planes. Based on the information of the operation 810, the electronic device may identify a user (e.g., a user 670 of FIG. 6A) browsing at least one of the plurality of planes. Based on the direction of the user, the electronic device may select the first area and the second area from among the candidate areas. The direction of the user may be identified based on the recognition of the position and/or direction of the user's preset body part, including the head, based on face recognition and/or pupil recognition. The first area may be determined as a candidate area having a maximum extent having a preset aspect ratio, among candidate areas identified in a plane overlapping the direction among the plurality of planes. The second area may be determined as a candidate area smaller than the first area, in a plane overlapped with the direction among the plurality of planes.

In operation 840, the method may include displaying the media content through the first area, and the UI having a layout based on the size of the second area and associated with the media content through the second area. According to an embodiment, the electronic device may display the media content through the first area, and the UI having a layout based on the size of the second area and associated with the media content through the second area. The electronic device may project the UI through the second area substantially simultaneously with projecting the media content into the first area. The electronic device may display a UI having a layout adjusted by a ratio of the width and the height of the second area, in the second area selected based on the operation 830. For example, in the UI, a plurality of visual objects may be arranged based on the aspect ratio of the second area. For example, in the UI, the plurality of visual objects may have sizes proportional to the size of the second area.

Figure 9:
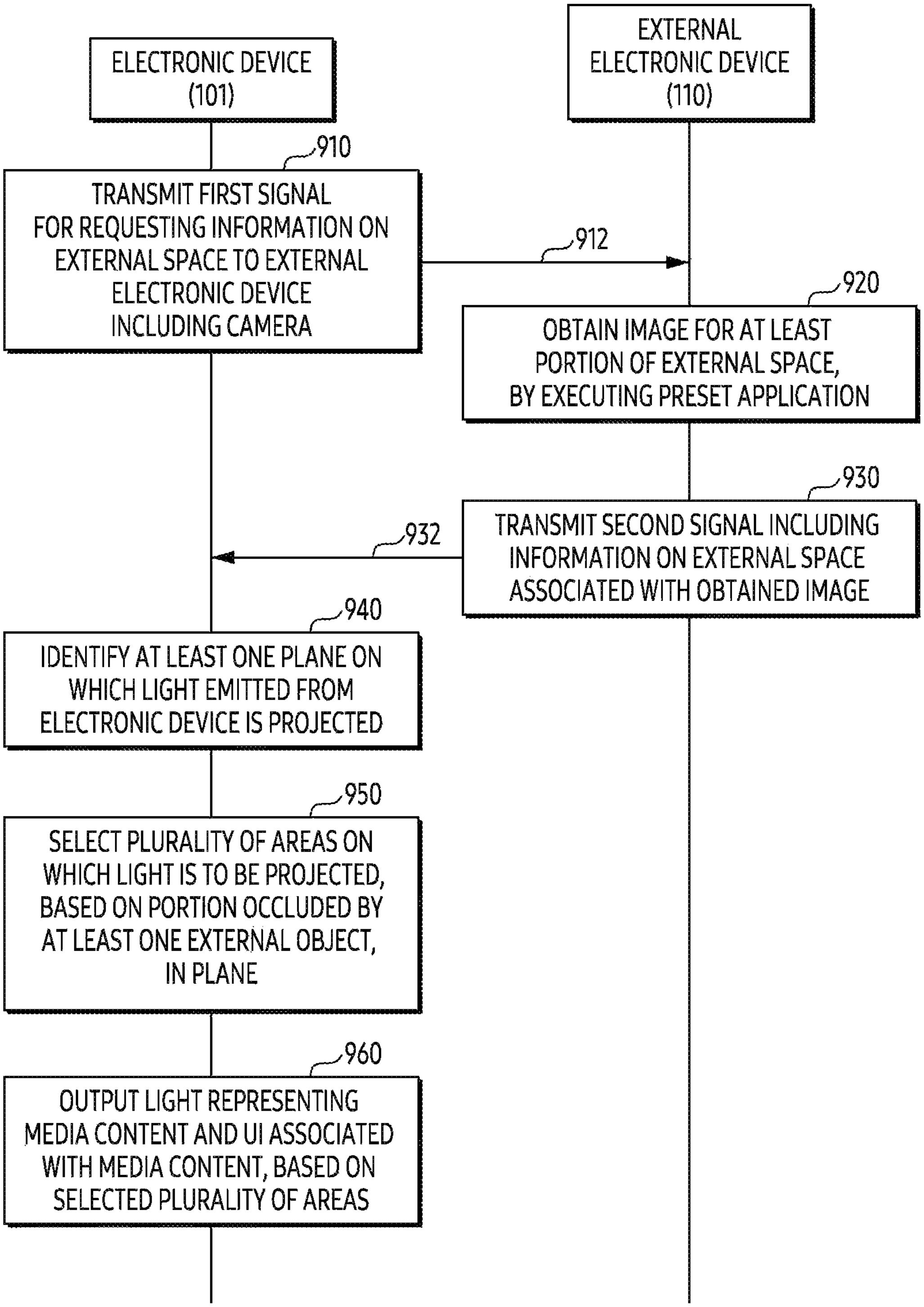
FIG. 9 illustrates an example of a flowchart of an electronic device and an external electronic device according to an embodiment.

FIG. 9 illustrates an example of a flowchart of a method performed by an electronic device 101 and an external electronic device 110 according to an embodiment. The electronic device 101 and the external electronic device 110 of FIG. 2 may include the electronic device 101 and the external electronic device 110 of FIG. 9. For example, an operation of the electronic device 101 described with reference to FIG. 9 may be performed by the electronic device 101 and/or a processor 210-1 of FIG. 2. For example, an operation of the external electronic device 110 described with reference to FIG. 9 may be performed by the external electronic device 110 and/or a processor 210-2 of FIG. 2.

In operation 910, according to an embodiment, the electronic device 101 may transmit a first signal 912 for requesting information on an external space to an external electronic device including a camera. The first signal 912 may include information indicating execution of an application (e.g., an application 270 of FIG. 2) installed in the external electronic device 110. The first signal 912 may include information indicating the transmission of an image for at least a portion of the external space based on the execution of the application.

In operation 920, according to an embodiment, the external electronic device 110 may obtain the image for at least a portion of the external space, by executing a preset application (e.g., the application 270 of FIG. 2). The external electronic device 110 may display a visual object (e.g., a visual object 305 of FIG. 3) for guiding capturing the external space to which light emitted from the electronic device 101 may reach.

In operation 930, according to an embodiment, the external electronic device 110 may transmit a second signal 932 including information on an external space associated with the obtained image. The second signal 932 may include the image of the operation 920. In case that the external electronic device 110 obtains a plurality of images, the second signal 932 may include the plurality of images. The external electronic device 110 may transmit the second signal 932 to the electronic device 101, in response to the first signal 912. The embodiment is not limited thereto, and for example, the external electronic device 110 may select different areas (e.g., a first area 141 to a second area 142 of FIG. 1) for displaying the media content and UI (e.g., UI associated with the media content), respectively, from the image of the operation 920. In the example, the external electronic device 110 may transmit the result of selecting the areas to the electronic device 101 by using the second signal 932.

In operation 940, according to an embodiment, the electronic device 101 may identify at least one plane on which the light emitted from the electronic device is projected. The electronic device 101 may identify at least one plane capable of reflecting the light output from the electronic device 101, such as the plane 120 of FIG. 1, based on the second signal 932 transmitted from the external electronic device 110. Similar to operation 710 of FIG. 7, the electronic device 101 may perform at least one of operations 910 and 940 of FIG. 9.

In operation 950, according to an embodiment, the electronic device 101 may select a plurality of areas on which the light is to be projected, based on a portion occluded by at least one external object, in the plane. In an embodiment, the electronic device 101 may perform the operation 950 of FIG. 9, similarly to at least one of operations 720 and 730 of FIG. 7.

In operation 960, according to an embodiment, the electronic device 101 may output light representing the media content and the UI associated with the media content, based on the selected plurality of areas. Based on operation 740 of FIG. 7, the electronic device 101 may obtain the UI including information associated with the media content displayed through a first area (e.g., the first area 141 of FIG. 1) among the plurality of areas. The electronic device 101 may display the UI in a second area smaller than the first area, in a state of displaying the media content in the first area.

According to an embodiment, the electronic device may identify at least one external object that occludes a plane for reflecting light emitted from the electronic device. The electronic device may emit light to a second portion different from a first portion in a plane occluded by at least one external object. The form of the second portion may be different from that of media content included in the light and having a quadrangular form. In order to increase the amount of information displayed through the second portion, the electronic device may select at least one second area different from the first area in which the media content is displayed, in the second portion. In the at least one second area, the electronic device may display the UI associated with the media content.

The electronic device according to an embodiment described with reference to FIGS. 1 to 9 may be associated with a metaverse service. Hereinafter, an example of a metaverse service provided to a user based on a wearable device according to an embodiment will be described with reference to FIG. 10.

Metaverse is a combination of the English words Meta, which means "virtual" and "transcendence," and "Universe," which means the universe, and refers to a three-dimensional virtual world where social, economic, and cultural activities like the real world take place. Metaverse is a concept that has evolved one step further than virtual reality, and it is characterized by using avatars to not only enjoy games or virtual reality (VR, cutting-edge technology that enables people to experience real-life experiences in a computerized virtual world), but also social and cultural activities like real reality. Metaverse service may provide media content to enhance immersion in the virtual world, based on augmented reality (AR), virtual reality environment (VR), mixed environment (MR), and/or extended reality (XR).

Figure 10:
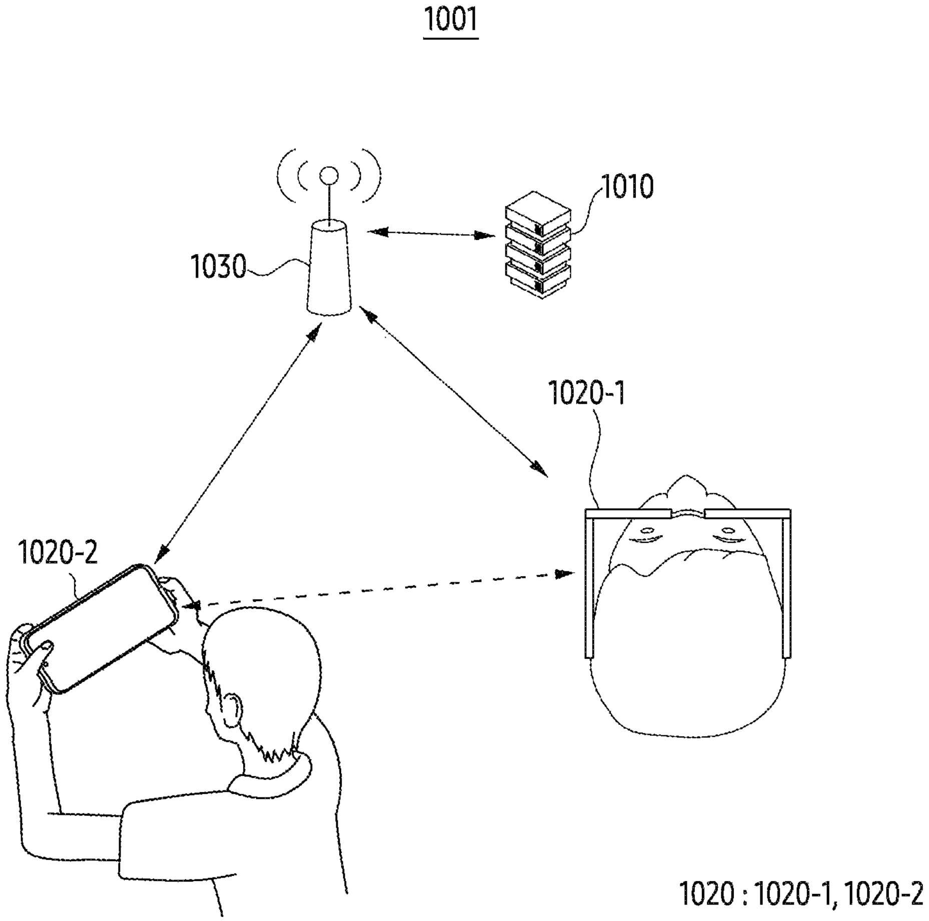
FIG. 10 is an example diagram of a network environment associated with a metaverse service.

For example, the media content provided by metaverse service may include social interaction content including a game, a concert, a party, and/or a conference based on an avatar. For example, the media content may include information for economic activities such as advertising, user-created content, and/or sales of products and/or shopping. Ownership of the user-created content may be proved by a blockchain-based non-fungible token (NFT). The metaverse service may support economic activities based on real money and/or cryptocurrency. Virtual content linked to the real world, such as digital twin or life logging, may be provided by the metaverse service. The metaverse service may be provided through a network based on fifth generation (5G) and/or sixth generation (6G). However, the disclosure is not limited to a network based on fifth generation (5G) and/or sixth generation (6G). FIG. 10 is an example diagram of a network environment 1001 that receives a metaverse service through a server 1010.

Referring to FIG. 10, the network environment 1001 may include a server 1010, a user terminal 1020 (e.g., a first terminal 1020-1 and a second terminal 1020-2), and a network connecting the server 1010 and the user terminal 1020. In the network environment 1001, the server 1010 may provide a metaverse service to the user terminal 1020. The network may be formed by at least one intermediate node 1030 including an access point (AP) and/or a base station. The user terminal 1020 may access the server 1020 through a network and output a user interface (UI) associated with the metaverse service to the user of the user terminal 1020. Based on the UI, the user terminal 1020 may obtain information to be inputted into the metaverse service from the user or output information associated with the metaverse service (e.g., multimedia content) to the user.

In this case, the server 1010 provides a virtual space so that the user terminal 1020 may perform activities in the virtual space. In addition, the user terminal 1020 may represent information provided by the server 1010 to the user or transmit information in which the user wants to represent in the virtual space to the server, by installing S/W agent to access a virtual space provided by the server 1010. The S/W agent may be provided directly through the server 1010, downloaded from a public server, or embedded and provided when purchasing a terminal.

In an embodiment, the metaverse service may be provided to the user terminal 1020 and/or the user by using the server 1010. The embodiment is not limited thereto, and the metaverse service may be provided through individual contact between users. For example, within the network environment 1001, the metaverse service may be provided by a direct connection between the first terminal 1020-1 and the second terminal 1020-2, independently of the server 1010. Referring to FIG. 10, in the network environment 1001, the first terminal 1020-1 and the second terminal 1020-2 may be connected to each other through a network formed by at least one intermediate node 1030. In an embodiment where the first terminal 1020-1 and the second terminal 1020-2 are directly connected, any one user terminal of the first terminal 1020-1 and the second terminal 1020-2 may serve as the server 1010. For example, a metaverse environment may be configured only with a device-to-device connection (e.g., a peer-to-peer (P2P) connection).

In an embodiment, the user terminal 1020 (or the user terminal 1020 including the first terminal 1020-1 and the second terminal 1020-2) may be made into various form factors, and may be characterized by including an input device for inputting information to the metaverse service and an output device that provides video and/or sound to the user. Examples of various form factors of the user terminal 1020 include a smartphone (e.g., the second terminal 1020-2), an AR device (e.g., the first terminal 1020-1), a VR device, an MR device, a video see through (VST) device, an optical see through (OST) device, a smart lens, a smart mirror, a TV or a projector capable of input/output.

Network (e.g., a network formed by at least one intermediate node 1030) include various broadband networks including 3G, 4G, and 5G, a short-range networks including Wi-Fi and BT (e.g., a wired network or a wireless network that directly connect the first terminal 1020-1 and the second terminal 1020-2).

In an embodiment, the user terminal 1020 of FIG. 10 may include the electronic device 101 of FIGS. 1 to 2.

In an embodiment, a method of increasing the amount of information displayed through one or more planes that reflect light emitted from the electronic device may be required. As described above, according to an embodiment, an electronic device (e.g., an electronic device 101 of FIGS. 1 to 9) may comprise a communication circuitry (e.g., a communication circuitry 230-1 of FIG. 2), a projection assembly (e.g., a projection assembly 240 of FIG. 2), and a processor (e.g., a processor 210-1 of FIG. 2). The processor may be configured to obtain information for a plane (e.g., a plane 120 of FIG. 1) where light emitted from the projection assembly is to be projected. The processor may be configured to identify, from the plane based on the information, a first area (e.g., a first area 141 of FIG. 1) having a preset ratio, and a second area (e.g., a second area 142 of FIG. 1) smaller than the first area. The processor may be configured to obtain, in a state that a media content displays in the first area identified by the communication circuitry, user interface (UI) associated with the media content. The processor may be configured to display, in the second area, the UI having layout based on a width and a height of the second area.

For example, the processor may be configured to obtain an image including the plane from the information. The processor may be configured to, in the image, based on identifying at least portion of the plane occluded by at least one external object, identify, based on another portion (e.g., a portion 320 of FIG. 3) in the plane different from the at least portion, the first area and the second area.

For example, the processor may be configured to identify, in the other portions in the plane, a plurality of candidate areas having the preset ratio. The processor may be configured to identify, among the plurality of candidate areas, a candidate area having a maximum extent as the first area.

For example, the processor may be configured to identify, in the other portions where the first area is segmented, the second area based on a condition corresponding to the UI.

For example, the processor may be configured to identify, among a first preset condition set by deviation between a width and a height, and a second preset condition set based on an extent, the condition corresponding to the UI.

For example, the processor may be configured to obtain, based on one of frames included in a video of the media content, the UI.

For example, the processor may be configured to display, text extracted from a frame used for obtaining the UI, in the UI.

For example, the processor may be configured to transmit, to an external electronic device (e.g., an external electronic device 110 of FIGS. 1 to 9) connected through the communication circuitry, a signal indicating to obtain the information including an image including the plane by executing an application (e.g., an application 270 of FIG. 2) executed by the external electronic device.

As described above, according to an embodiment, a method of an electronic device may comprise obtaining information with respect to one or more planes where light emitted from a projection assembly of the electronic device is to be projected. The method may comprise displaying, in a first area identified in the one or more planes based on the information, a media content. The method may comprise, based on the media content, identifying, in the one or more planes, a second area different from the first area. The method may comprise displaying, in the second area, user interface (UI) that is associated with the media content and having layout based on a width and height of the second area.

For example, the obtaining may comprise transmitting, to an external electronic device through a communication circuitry of the electronic device, a first signal indicating to obtain information with respect to the one or more planes, by executing a preset application of the external electronic device. The method may comprise obtaining, based on a second signal transmitted as a response to the first signal from the external electronic device, the information including at least one image with respect to the one or more planes.

For example, the displaying the media content may comprise projecting onto the first area having a preset aspect ratio, light representing the media content.

For example, the displaying the media content may comprise identifying, a plurality of candidate areas having a preset aspect ratio in other portion different from a portion occluded by at least one external object in the one or more planes. The method may comprise determining, a candidate area having a maximum extent among the plurality of candidate areas, as the first area.

For example, the identifying the second area may comprise identifying, in other portion in the one or more planes where the first area is excluded, the second area having an extent or an aspect ratio indicated by the media content.

For example, the displaying the UI may comprise displaying, in a state where the media content is displayed in the first area, a preset UI selected by the media content among preset UIs stored in a memory of the electronic device, in the second area.

For example, the displaying the UI may comprise displaying, by adjusting layout of the preset UI selected by the media content based on an aspect ratio of the second area, the UI associated with the media content.

As described above, according to an embodiment, a method of an electronic device may comprise obtaining information for a plane where light emitted from a projection assembly of the electronic device is to be projected. The method may comprise identifying, from the plane based on the information, a first area having a preset ratio, and a second area smaller than the first area. The method may comprise obtaining, in a state that a media content displays in the first area identified by a communication circuitry of the electronic device, user interface (UI) associated with the media content. The method may comprise displaying, in the second area, the UI having layout based on a width and a height of the second area.

For example, the identifying may comprise obtaining an image including the plane from the information. The method may comprise, in the image, based on identifying at least portion of the plane occluded by at least one external object, identifying, based on another portion in the plane different from the at least portion, the first area and the second area.

For example, the identifying the first area may comprise identifying, in the other portions in the plane, a plurality of candidate areas having the preset ratio. The method may comprise identifying, among the plurality of candidate areas, a candidate area having a maximum extent as the first area.

For example, the identifying the second area may comprise identifying, in the other portions where the first area is segmented, the second area based on a condition corresponding to the UI.

For example, the identifying the second area may comprise identifying, among a first preset condition set by deviation between a width and a height, or a second preset condition set based on an extent, the condition corresponding to the UI.

For example, the obtaining the UI may comprise obtaining, based on one of frames included in a video of the media content, the UI.

For example, the displaying the UI may comprise displaying, text extracted from a frame used for obtaining the UI, in the UI.

For example, the obtaining may comprise transmitting, to an external electronic device connected through the communication circuitry, a signal indicating to obtain the information including an image including the plane by executing an application executed by the external electronic device.

As described above, according to an embodiment, an electronic device (e.g., an electronic device 101 of FIGS. 1 to 9) may comprise a projection assembly and a processor. The processor may be configured to obtain information with respect to one or more planes where light emitted from the projection assembly (e.g., the electronic device 101 of FIGS. 1 to 9) is to be projected. The processor may be configured to display, in a first area identified in the one or more planes based on the information, a media content. The processor may be configured to, based on the media content, identify, in the one or more planes, a second area different from the first area. The processor may be configured to display, in the second area, user interface (UI) that is associated with the media content and having layout based on a width and height of the second area.

For example, the electronic device may comprise a communication circuitry (e.g., the electronic device 101 of FIGS. 1 to 9). The processor may be configured to transmit, to an external electronic device (e.g., the external electronic device 110 of FIGS. 1 to 9) through the communication circuitry of the electronic device, a first signal (e.g., a first signal 912 of FIG. 9) indicating to obtain information with respect to the one or more planes, by executing a preset application (e.g., an application 270 of FIG. 2) of the external electronic device. The processor may be configured to obtain, based on a second signal (e.g., a second signal 932 of FIG. 9) transmitted as a response to the first signal from the external electronic device, the information including at least one image with respect to the one or more planes.

For example, the processor may be configured to project onto the first area having a preset aspect ratio, light representing the media content.

For example, the processor may be configured to identify, a plurality of candidate areas having a preset aspect ratio in other portion different from a portion occluded by at least one external object in the one or more planes. The processor may be configured to determine, a candidate area having a maximum extent among the plurality of candidate areas, as the first area.

For example, the processor may be configured to identify, in other portion in the one or more planes where the first area is excluded, the second area having an extent or an aspect ratio indicated by the media content.

For example, the electronic device may further comprise a memory (e.g., a memory 220-1 of FIG. 1). The processor may be configured to display, in a state where the media content is displayed in the first area, a preset UI selected by the media content among preset UIs stored in the memory, in the second area.

For example, the processor may be configured to display, by adjusting layout of the preset UI selected by the media content based on an aspect ratio of the second area, the UI associated with the media content.

The devices described above may be implemented as a hardware component, a software component, and/or a combination of the hardware component and the software component. For example, the device and component described in the embodiments may be implemented by using one or more general purpose computers or special purpose computers such as a processor, a controller, an arithmetic logic unit (ALU), a digital signal processor, a microcomputer, a field programmable gate array (FPGA), a programmable logic unit (PLU), a microprocessor, any other device capable of executing and responding to an instruction. The processing device may perform an operating system (OS) and one or more software applications performed on the operating system. In addition, the processing device may access, store, manipulate, process, and generate data in response to execution of the software. For convenience of understanding, although one processing device may be described as being used, a person having ordinary knowledge in the relevant technical field may see that the processing device may include a plurality of processing elements and/or a plurality of types of processing elements. For example, the processing device may include a plurality of processors or one processor and one controller. In addition, another processing configuration, such as a parallel processor, is also possible.

The software may include a computer program, code, instruction, or a combination of one or more of them, and may configure the processing device to operate as desired or may instruct the processing device independently or collectively. The software and/or data may be embodied in any type of machine, component, physical device, computer storage medium, or device, to be interpreted by the processing device or to provide the instruction or data to the processing device. The software may be distributed on a network-connected computer system and stored or executed in a distributed manner. The software and data may be stored in one or more computer-readable recording medium.

The method according to the embodiment may be implemented in the form of a program instruction that may be recorded in a computer-readable medium and performed through various processors and/or computers. In this case, the medium may continuously store a program executable by a computer or may temporarily store the program for execution or download. In addition, the medium may be various recording components or storage components in the form of a single unit or a combination of several pieces of hardware, but is not limited to a medium directly connected to a certain computer system, and may exist distributed on the network. An example of medium may be configured to store a program instruction, by including magnetic medium such as a hard disk, a floppy disk and a magnetic tape, optical recording medium such as a CD-ROM and a DVD, magneto-optical medium such as a floptical disk, a ROM, a RAM, a flash memory, and the like. In addition, an example of another medium may include an app store that distribute an application, a site that supply or distribute various software, and recording medium or storage medium managed by servers.

As described above, although the embodiments have been described by a limited embodiment and a drawing, a person having ordinary knowledge in the relevant technical field may make various modifications and variations from the above description. For example, even if the described techniques are performed in a different order from the described method, and/or components such as the described system, structure, device, circuitry, and the like are coupled or combined in a different form from the described method or are replaced or substituted by another component or equivalent, an appropriate result may be achieved.

Therefore, other implementations, other embodiments, and equivalents of the patents are also in the scope of the claims to be described later.

What is claimed is:

1. An electronic device, comprising:
- a projector; and
- a processor configured to:
  - obtain information related to a projection area on which light emitted from the projector is to be projected;
  - determine, based on the information, a first area in the projection area to display a content and control the projector to display the content in the first area, the first area having a first ratio;
  - determine, based on the information, a second area smaller than the first area to display user interface (UI) associated with the content and control the projector to display the UI in the second area while the content is displayed in the first area, the UI having layout configured based on a feature of the second area,
  - wherein the second area corresponds to an area that does not overlap the first area.

2. The electronic device of claim 1, wherein the processor is further configured to:
- obtain an image comprising the projection area from the information, the projection area comprising a plane on which the light emitted from the projector is to be projected;
- identify a third area in the plane, the third area being occluded by at least one external object; and
- identify a portion in the plane different from the third area.

3. The electronic device of claim 2, wherein the processor is further configured to:
- identify, in the portion in the plane, a plurality of candidate areas having the first ratio; and
- identify, among the plurality of candidate areas, a first candidate area having a maximum extent as the first area.

4. The electronic device of claim 2, wherein the processor is further configured to:
- identify, in the portion in the plane, the second area based on a condition corresponding to the UI.

5. The electronic device of claim 4, wherein the processor is further configured to:
- identify, among a first condition set by deviation between a width and a height, and a second condition set based on an extent, the condition corresponding to the UI.

6. The electronic device of claim 1, wherein the processor is further configured to:
- obtain the UI based on one of a plurality of frames included in a video of the content; and
- display in the UI, text extracted from a frame used for obtaining the UI.

7. The electronic device of claim 1,
- wherein the UI projected onto the second area includes a plurality of visual objects indicating the information which are arranged in accordance with a shape of the second area.

8. The electronic device of claim 1, wherein the processor configured to:

transmit, to an external electronic device, a signal to obtain the information comprising an image comprising the projection area.

9. A method of an electronic device, comprising:

obtaining information related to one or more projection areas of the electronic device;

displaying a content in a first area identified in the one or more projection areas based on the information;

based on the content, identifying a second area smaller from the first area, in the one or more projection areas based on the information; and displaying, in the second area, user interface (UI) associated with the content while the content is displayed in the first area, the UI having layout based on a feature the second area, wherein the second area corresponds to an area that does not overlap the first area.

10. The method of claim 9, wherein the obtaining comprises:

transmitting, to an external electronic device, a signal to obtain the information related to one or more projection areas;

obtaining, from the external electronic device, the information comprising at least one image comprising one or more projection areas.

11. The method of claim 9, wherein the displaying the content comprises:

projecting onto the first area having a first aspect ratio, light representing the content.

12. The method of claim 9, wherein the displaying the content comprises:

identifying, a plurality of candidate areas having a first aspect ratio in a first portion in the one or more projection areas different from a second portion in the one or more projection areas occluded by at least one external object;

determining, a first candidate area having a maximum extent among the plurality of candidate areas, as the first area.

13. The method of claim 12, wherein the identifying the second area comprises:

identifying, in the first portion, the second area having an extent or a second aspect ratio based on the content.

14. The method of claim 9, wherein the displaying the UI comprises:

displaying in the second area a first UI corresponding to the content, among a plurality of UIs stored in a memory of the electronic device.

15. The method of claim 14, wherein the displaying the UI comprises:

displaying the UI associated with the content by adjusting layout of the first UI selected based on an aspect ratio of the second area.

16. A method of an electronic device, comprising:

obtaining information related to a projection area on which light emitted from a projector of the electronic device is to be projected;

determining, based on the information, a first area in the projection area to display a content and control the projector to display the content in the first area, the first area having a first ratio;

determine, based on the information, a second area smaller than the first area to display user interface (UI) associated with the content and displaying the UI in the second area while the content is displayed in the first area, the UI having layout configured based on a feature of the second area, wherein the second area corresponds to an area that does not overlap the first area.

17. The method of claim 16, further comprises:

obtaining an image comprising the projection area from the information, the projection area comprising a plane on which the light emitted from the projector is to be projected;

identifying a third area in the plane, the third area being occluded by at least one external object; and identify a portion in the plane different from the third area.

18. The method of claim 17, further comprises: identifying, in the portion in the plane, a plurality of candidate areas having the first ratio; identifying, among the plurality of candidate areas, a first candidate area having a maximum extent as the first area.

19. The method of claim 17, further comprises:

identifying, in the portion in the plane, the second area based on a condition corresponding to the UI.

20. The method of claim 19, wherein the identifying the second area comprises:

identifying, among a first condition set by deviation between a width and a height, and a second condition set based on an extent, the condition corresponding to the UI.

* * * * *